United States Patent
Ishii et al.

(10) Patent No.: US 8,335,147 B2
(45) Date of Patent: Dec. 18, 2012

(54) REPRODUCTION APPARATUS AND REPRODUCTION METHOD

(75) Inventors: Toshiki Ishii, Yokohama (JP); Kenichi Shimada, Yokohama (JP); Yusuke Nakamura, Ebina (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/086,421

(22) Filed: Apr. 14, 2011

(65) Prior Publication Data

US 2011/0261671 A1 Oct. 27, 2011

(30) Foreign Application Priority Data

Apr. 21, 2010 (JP) ................................. 2010-097497

(51) Int. Cl.
*G11B 7/00* (2006.01)
(52) U.S. Cl. ........................................................ 369/103
(58) Field of Classification Search .................. 369/103; 359/10, 11, 22, 32
See application file for complete search history.

(56) References Cited

U.S. PATENT DOCUMENTS

| | | | |
|---|---|---|---|
| 2007/0206255 A1* | 9/2007 | Yamakage et al. | 359/24 |
| 2008/0094998 A1* | 4/2008 | Jeong et al. | 369/103 |
| 2008/0165654 A1* | 7/2008 | Fukuhara | 369/103 |
| 2008/0219128 A1* | 9/2008 | Ide et al. | 369/103 |
| 2009/0073850 A1* | 3/2009 | Ide et al. | 369/103 |
| 2009/0080318 A1 | 3/2009 | Tatsuta et al. | |
| 2009/0161519 A1* | 6/2009 | Yamamoto et al. | 369/103 |
| 2009/0225641 A1* | 9/2009 | Sugita et al. | 369/103 |

FOREIGN PATENT DOCUMENTS

JP 2009-80906 4/2009

\* cited by examiner

*Primary Examiner* — Thang Tran
(74) *Attorney, Agent, or Firm* — Antonelli, Terry, Stout & Kraus, LLP.

(57) ABSTRACT

In case of reproducing a hologram recorded on an optical information recording medium, adjusting beam with the amplitude distribution and phase distribution at least partially the same as those of a signal beam upon recording is radiated to the optical information recording medium which records information. The diffracting beam diffracted by the hologram is detected by a photodetector. Based on the detected information, an incident angle of the reference beam to the optical information recording medium is appropriately controlled.

14 Claims, 17 Drawing Sheets

INSERT DISC ⇨ Ready

Ready ⇨ RECORD DATA

Ready ⇨ REPRODUCE DATA

REPRODUCTION APPARATUS AND REPRODUCTION METHOD

CLAIM OF PRIORITY

The present application claims priority from Japanese patent application serial No. JP 2010-097497, filed on Apr. 21, 2010, the content of which is hereby incorporated by reference into this application.

BACKGROUND OF THE INVENTION

1. Field of the Invention

The present invention relates to an apparatus and a method for reproducing information from a recording medium using holography.

2. Description of the Related Art

Recently, standard of Blu-ray Disc using blue-violet semiconductor laser has realized commercialization of optical disc with recording density of approximately 50 GB in the consumer market. The optical disc is highly demanded to have capacity as large as that of the HDD (Hard Disc Drive) with size ranging from 100 GB to 1 TB.

However, new type density growth technology different from the one using short wavelength and objective lens with large NA is required for the purpose of realizing the super-dense optical disc.

There has been a trend to study storage technology for next generation, and the holographic recording technology for recording digital information with holography has been focused. The holographic recording technology is intended to record information in the recording medium by overlapping a signal beam which contains page data information that has been two-dimensionally modulated by a spatial light modulator with the reference beam in the recording medium, and causing the recording medium to modulate refraction index therein using the resultant interference pattern.

When exposing the recording medium with the reference beam used for recording to upon reproduction of the information, the hologram recorded in the recording medium functions as the diffraction grating to generate a diffraction beam. The resultant diffraction beam which includes the recorded signal beam and phase information is recovered as the same beam.

The recovered signal beam is two-dimensionally detected at high speeds by a photodetector such as CMOS and CCD. The holographic recording technology allows a single hologram to directly record the two-dimensional information in the optical recording medium, and the recorded information to be reproduced. A plurality of page data may be overwritten on a certain region of the recording medium, thus executing high speed recording/reproduction of information with large capacity.

In case of reproducing the hologram, the angle of the reference beam has to be stringently controlled. The condition for optimum angle of the reference beam does not necessarily coincide with the one at a time of recording owing to the influence of contraction or expansion, or change in the refractive index of the medium resulting from the temperature difference between recording and reproduction.

Japanese Unexamined Patent Publication No. 2009-80906 (Patent Document 1) discloses the following description as abstract, that is, the optical information recording/reproduction apparatus includes an optical system that collects an information beam and a reference beam to a holographic memory recording medium 10 having a hologram recording layer 13 and a diffraction grating 15 disposed in the hologram recording layer 13, and guides a servo laser beam A into the diffraction grating 15 to transmit it; photodetectors 1 and 3 that detect diffracted transmitted beams A1 and A3 diffracted and transmitted by the diffraction grating 15; an actuator 242 that moves the holographic memory recording medium 10; and an adjusting unit 240 that controls the actuator 242 based on intensities of the diffracted transmitted beams A1 and A3 detected by the photodetectors 1 and 3, and adjusts a position or an angle of the holographic memory recording medium 10.

SUMMARY OF THE INVENTION

The aforementioned apparatus as Patent Document 1 requires laser beam for servo, thus increasing the cost. The apparatus disclosed in Patent Document 1 is not configured to execute the angle control by directly observing the hologram which contains the information. Accordingly, the user is not capable of confirming whether the angle is controlled to the appropriate value until reproduction of the hologram which contains the information.

It is an object of the present invention to provide a technology for appropriately setting the reference beam angle through the apparatus using the holographic recording technique while reducing costs.

The above-described object may be established by radiating the beam to which the adjusting information is added to the recording medium, for example.

The present invention presents a reproduction apparatus and a reproduction method capable of reproducing the information recorded through the holographic recording technique at appropriate reference beam angle while reducing costs.

BRIEF DESCRIPTION OF THE DRAWINGS

These and other features, objects and advantages of the present invention will become more apparent from the following description when taken in conjunction with the accompanying drawings wherein.

DESCRIPTION OF THE PREFERRED EMBODIMENTS

Exemplary embodiments of the present invention will be described hereinafter.

Figure 1:
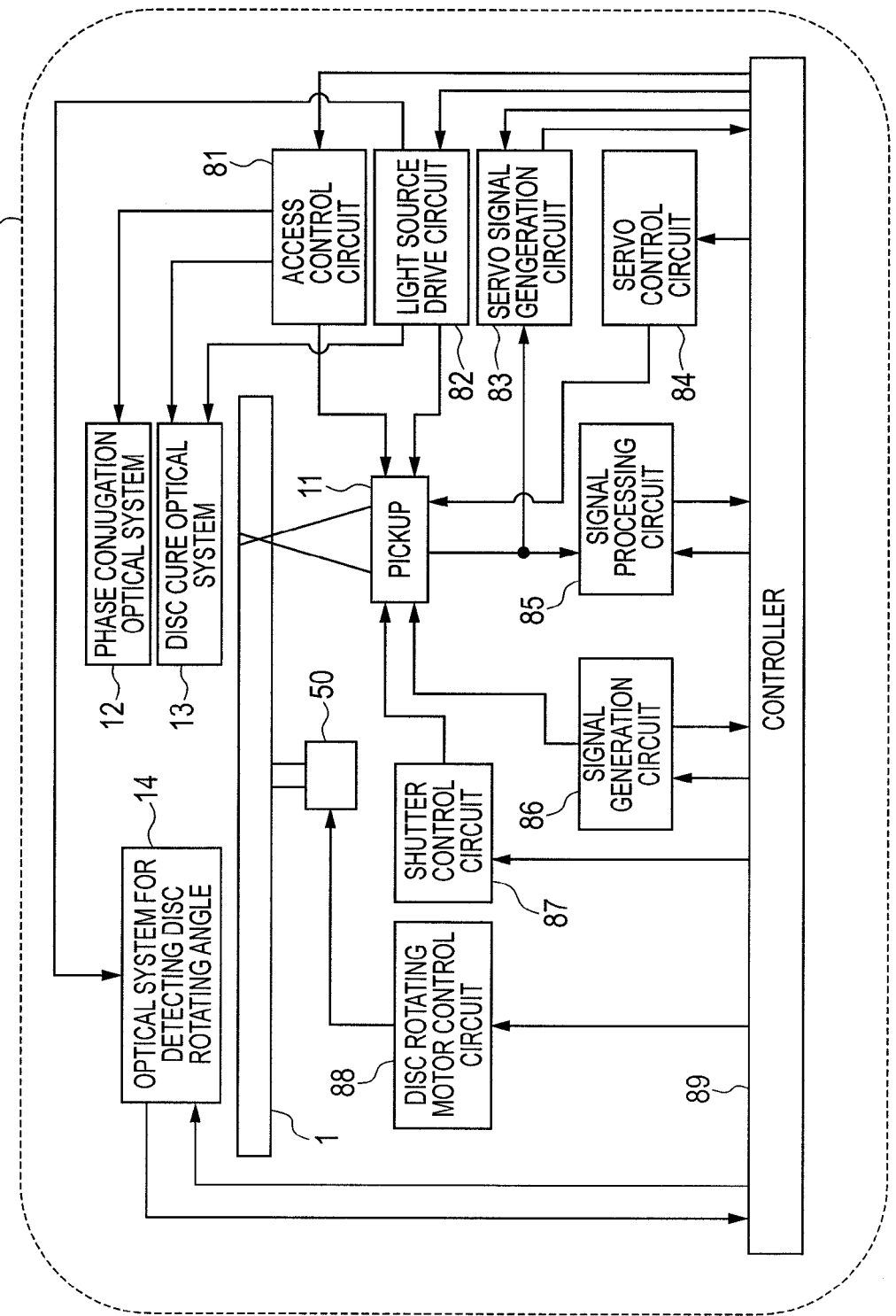
FIG. 1 is a schematic view representing an optical information recording/reproduction apparatus according to an exemplary embodiment.

Embodiments of the present invention will be described referring to the drawings. FIG. 1 is a block diagram illustrating a recording/reproduction apparatus of an optical information recording medium, which records and/or reproduces digital information using holography. Components common to the respective embodiments will be described.

An optical information recording/reproduction apparatus 10 includes a pickup 11, a phase conjugation optical system 12, a disc Cure optical system 13, an optical system 14 for detecting disc rotating angle, and a rotary motor 50. The rotary motor 50 allows an optical information recording medium 1 to be rotatable.

The pickup 11 exposes the optical information recording medium 1 with a reference beam and a signal beam to record digital information in the recording medium using holography. At this time, the information signal to be recorded is sent to a spatial light modulator in the pickup 11 by a controller 89 via a signal generation circuit 86. The signal beam is modulated by the spatial light modulator.

When reproducing the information recorded in the optical information recording medium 1, a phase conjugate beam of the reference beam from the pickup 11 is generated by the phase conjugation optical system 12. The phase conjugate beam denotes an optical wave which proceeds in reverse direction of the input beam while keeping the same wavefront. The recovered beam recovered by the phase conjugate beam is detected by a photodetector (to be described later) in the pickup 11. A signal processing circuit 85 reproduces the signal.

The time for radiating the reference beam and the signal beam to the optical information recording medium 1 may be adjusted by allowing the controller 89 to control an opening/closing time of the shutter in the pickup 11 via a shutter control circuit 87.

The disc Cure optical system 13 serves to generate optical beams used for pre-cure and pos-cure of the optical information recording medium 1. The term "pre-cure" denotes the preceding process for preliminarily radiating predetermined optical beams to a desired position before radiation of the reference beam and the signal beam upon recording of the information to the desired position in the optical information recording medium 1. The term "post-cure" denotes the subsequent process for radiating predetermined optical beams for invalidating additional writing on the desired position after recording such information on such position in the optical information recording medium 1.

The optical system 14 for detecting disc rotating angle is used for detecting the rotating angle of the optical information recording medium 1. The rotating angle of the optical information recording medium 1 is adjusted to the predetermined angle by allowing the optical system 14 for detecting disc rotating angle to detect the signal corresponding to the rotating angle, and the controller 89 to use the detected signal to control the rotating angle of the optical information recording medium 1 via a disc rotating motor control circuit 88.

A light source drive circuit 82 supplies predetermined light source driving current to light sources for the pickup 11, the disc Cure optical system 13 and the optical system 14 for detecting disc rotating angle. Each of the respective light sources is capable of emitting optical beam at predetermined light intensity.

The pickup 11 and the disc Cure optical system 13 are equipped with mechanisms capable of radially sliding the position with respect to the optical information recording medium 1 so that the position control is executed via an access control circuit 81.

The recording technique based on holography angular multiplexing principle tends to reduce allowable error to deviation of the reference beam angle to a considerable low level.

This necessitates the mechanism for detecting the deviation of the reference beam angle in the pickup 11 for allowing a servo signal generation circuit 83 to generate a servo controlling signal, and further a servo mechanism for correcting the deviation via a servo control circuit 84 in the optical information recording/reproduction apparatus 10.

The pickup 11, the disc Cure optical system 13 and the optical system 14 for detecting disc rotating angle may have some or all of the optical system structures combined into a single structure for simplification.

Figure 2:
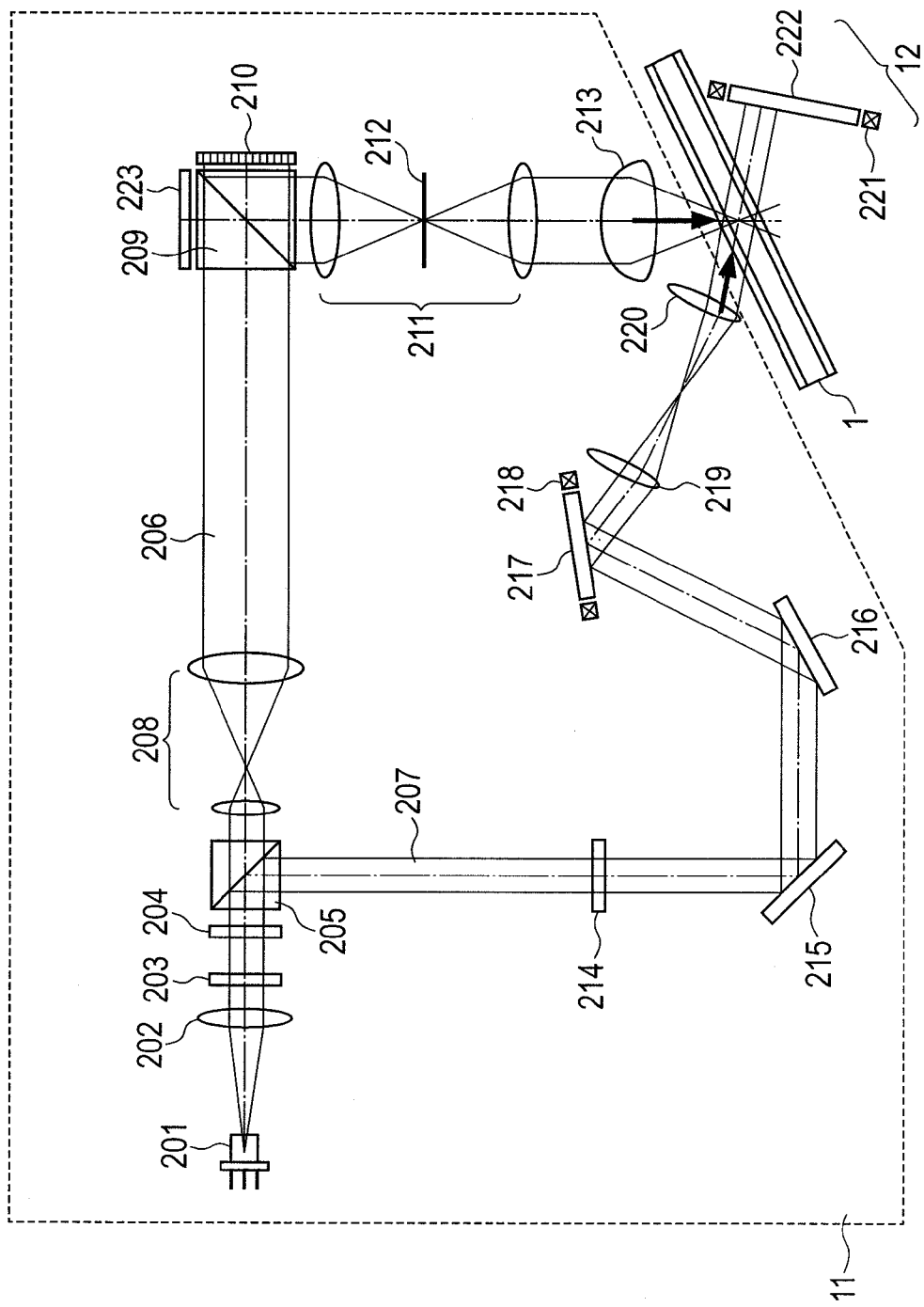
FIG. 2 is a schematic view representing recording principle of a basic optical system of a pickup in the optical information recording/reproduction apparatus.

FIG. 2 represents recording principle of an exemplary basic optical system structure of the pickup 11 in the optical information recording/reproduction apparatus 10. The optical beam from a light source 201 transmits a collimated lens 202, and then is made incidence to a shutter 203. While the shutter 203 is opened, the optical beam passes through the shutter 203, and subjected to polarization direction control by an optical element 204 formed of a half-wavelength plate so that light intensity ratio between p-polarized component and s-polarized component becomes a desired ratio. It is then made incidence to a PBS (Polarization Beam Splitter) prism 205.

The optical beam which has transmitted the PBS prism 205 serves as a signal beam 206. The optical beam has its diameter expanded by a beam expander 208, transmits a PBS prism 209, and then is made incidence to a spatial light modulator 210.

The signal beam to which the information is added by the spatial light modulator 210 is reflected by the PBS prism 209, and propagates through a relay lens 211 and a spatial filter 212. Thereafter, the signal beam is condensed on the optical information recording medium 1 by an objective lens 213. The spatial light modulator 210 may be combined with a phase mask function.

Meanwhile, the optical beam reflecting from the PBS prism 205 serves as a reference beam 207, and is set in a predetermined polarization direction by a polarization direction transformation device 214 in accordance with recording or reproduction. It is made incidence to a galvanic mirror 217 via mirrors 215 and 216. The angle of the galvanic mirror 217 may be adjusted by the actuator 218. The incident angle of the reference beam which is made incidence to the optical information recording medium 1 may be set to the desired angle after passage through the lenses 219 and 220. In order to set the incident angle of the reference beam, the element for converting the wavefront of the reference beam may be employed instead of the galvanic mirror.

The signal beam and the reference beam are made incidence to the optical information recording medium 1 while being overlapped so as to form an interference pattern in the recording medium. The information is recorded by writing the pattern in the recording medium. The incident angle of the reference beam that has been made incidence to the optical information recording medium 1 may be changed by the galvanic mirror 217, thus enabling angular multiplexing recording.

Each of holograms recorded in the same region at different reference beam angles, which corresponds to the reference beam angle will be referred to as a page, and a group of angular multiplexed pages in the same region will be referred to as a book.

Figure 3:
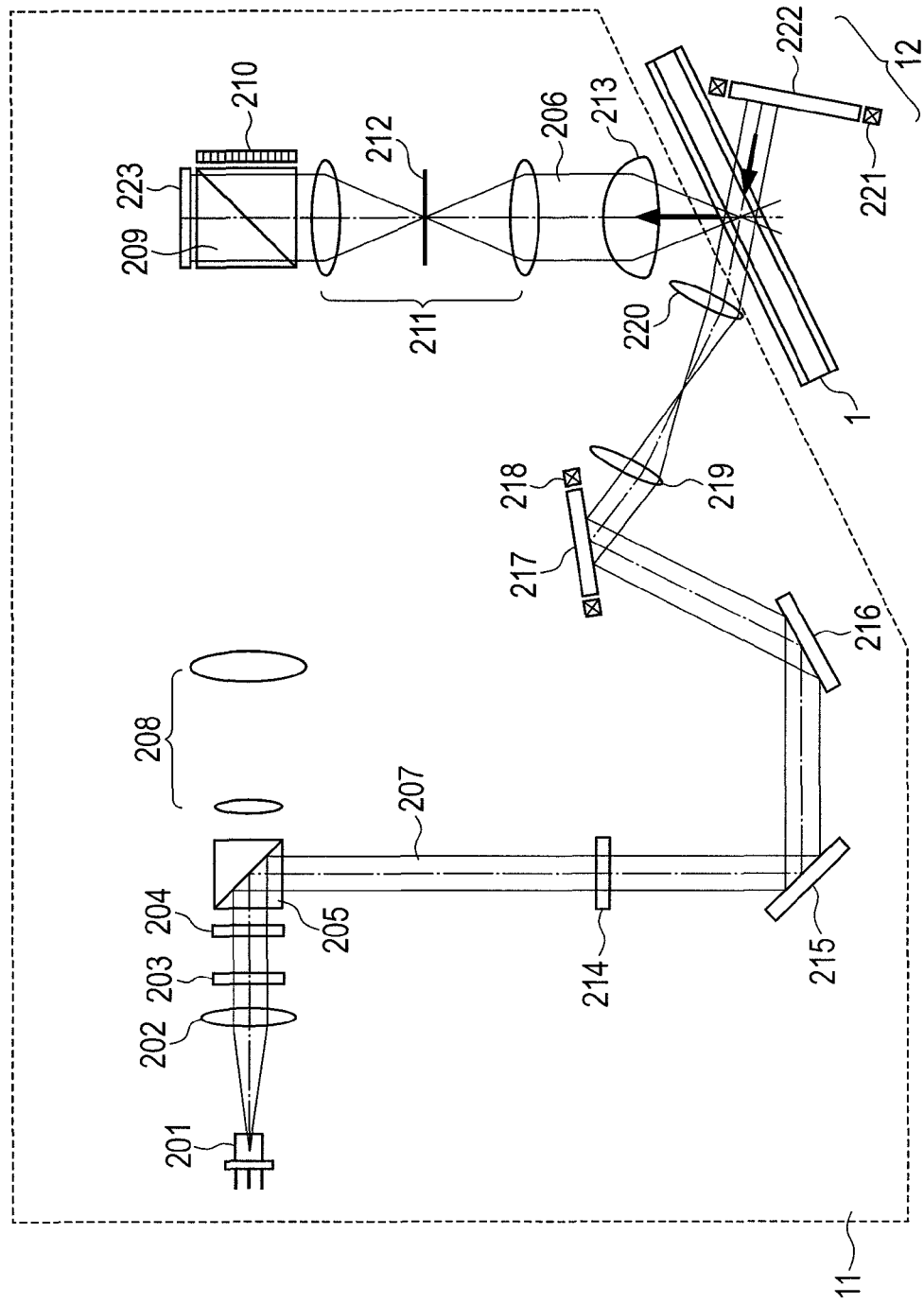
FIG. 3 is a schematic view representing reproduction principle of the basic optical system of the pickup in the optical information recording/reproduction apparatus.

FIG. 3 represents reproduction principle of an exemplary basic optical system structure of the pickup 11 in the optical information recording/reproduction apparatus 10. The recorded information is reproduced by making the reference beam incidence to the optical information recording medium 1. The optical beam which has transmitted the optical information recording medium 1 is reflected by a galvanic mirror 222 having the angle adjustable by an actuator 221 to generate the phase conjugate beam.

The signal beam recovered by the phase conjugate beam propagates through the objective lens 213, the relay lens 211 and the spatial filter 212. Thereafter, the signal beam transmits the PBS prism 209, and enters a photodetector 223 so as to reproduce the recorded signal.

The explanations with respect to common parts of the basic optical systems shown in FIGS. 2 and 3 will be omitted from descriptions of the following exemplary embodiments.

Figure 4A:
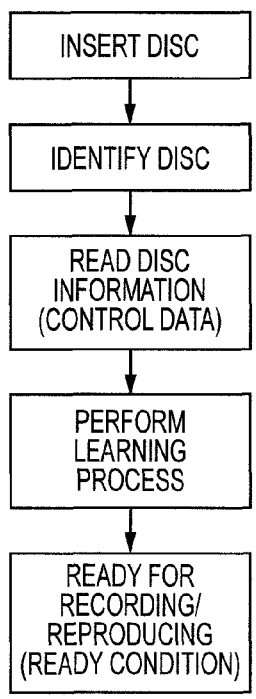
FIGS. 4A to 4C represent basic process flows executed by the optical information recording/reproduction apparatus.
Figure 4B:
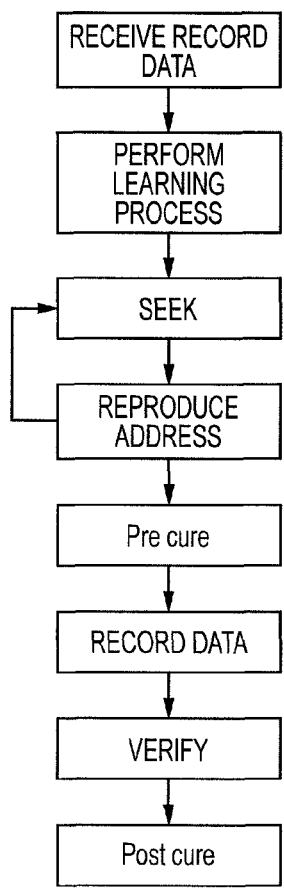
Figure 4C:
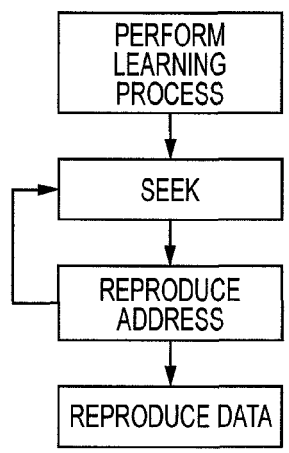

FIGS. 4A to 4C represent process flows for recording/reproduction performed by the optical information recording/reproduction apparatus 10. The recording/reproduction using holography will be especially explained.

FIG. 4A shows the process flow from insertion of the optical information recording medium 1 into the optical information recording/reproduction apparatus 10 until it becomes ready for recording/reproduction. FIG. 4B shows the process flow from the ready condition until the information is recorded in the optical information recording medium 1. FIG. 4C shows the process flow from the ready condition until the information recorded in the optical information recording medium 1 is reproduced.

Referring to FIG. 4A, after insertion of the medium, the optical information recording/reproduction apparatus 10 determines whether the inserted medium is the one for recording or reproducing digital information using holography.

After the disc determination, when it is determined that the inserted disc is the optical information recording medium for recording/reproducing the digital information using holography, the optical information recording/reproduction apparatus 10 reads control data stored in the optical information recording medium, and obtains information about the optical information recording medium, and the information about various types of setting conditions for recording/reproduction, for example.

After reading the control data, learning process with respect to various types of adjustment corresponding to the control data and the pickup 11 is executed. The optical information recording/reproduction apparatus 10 completes preparation for recording or reproduction.

Referring to FIG. 4B indicating the process flow from ready condition until recording of the information, the data to be recorded are received, and the information corresponding to the data is sent to the spatial light modulator in the pickup 11.

Various kinds of leaning processes are preliminarily executed in need so as to record high quality information in the optical information recording medium. Each position of the pickup 11 and the disc Cure optical system 13 is located at the predetermined position of the optical information recording medium while executing seeking and reproducing the address repeatedly.

The optical beam from the disc Cure optical system 13 is used to pre-cure the predetermined region, and the reference beam and the signal beam from the pickup 11 are used to record the data.

After recording, the data are verified in need, and the optical beam from the disc Cure optical system 13 is used for executing the post-cure.

In the process flow from the ready condition until reproduction of the recorded information, various kinds of learning processes are preliminarily executed in need so as to reproduce high quality information from the optical information recording medium as represented by FIG. 4C. Thereafter, each position of the pickup 11 and the phase conjugation optical system 12 is located at the predetermined position of the optical information recording medium while executing seeking and reproducing address repeatedly.

Then the reference beam is radiated from the pickup 11 to read the information recorded in the optical information recording medium.

Referring to FIG. 4C, the present invention may be applied before learning process of the reproduction or data reproduction, or simultaneously with the data reproduction.

(First Embodiment)

Figure 5:
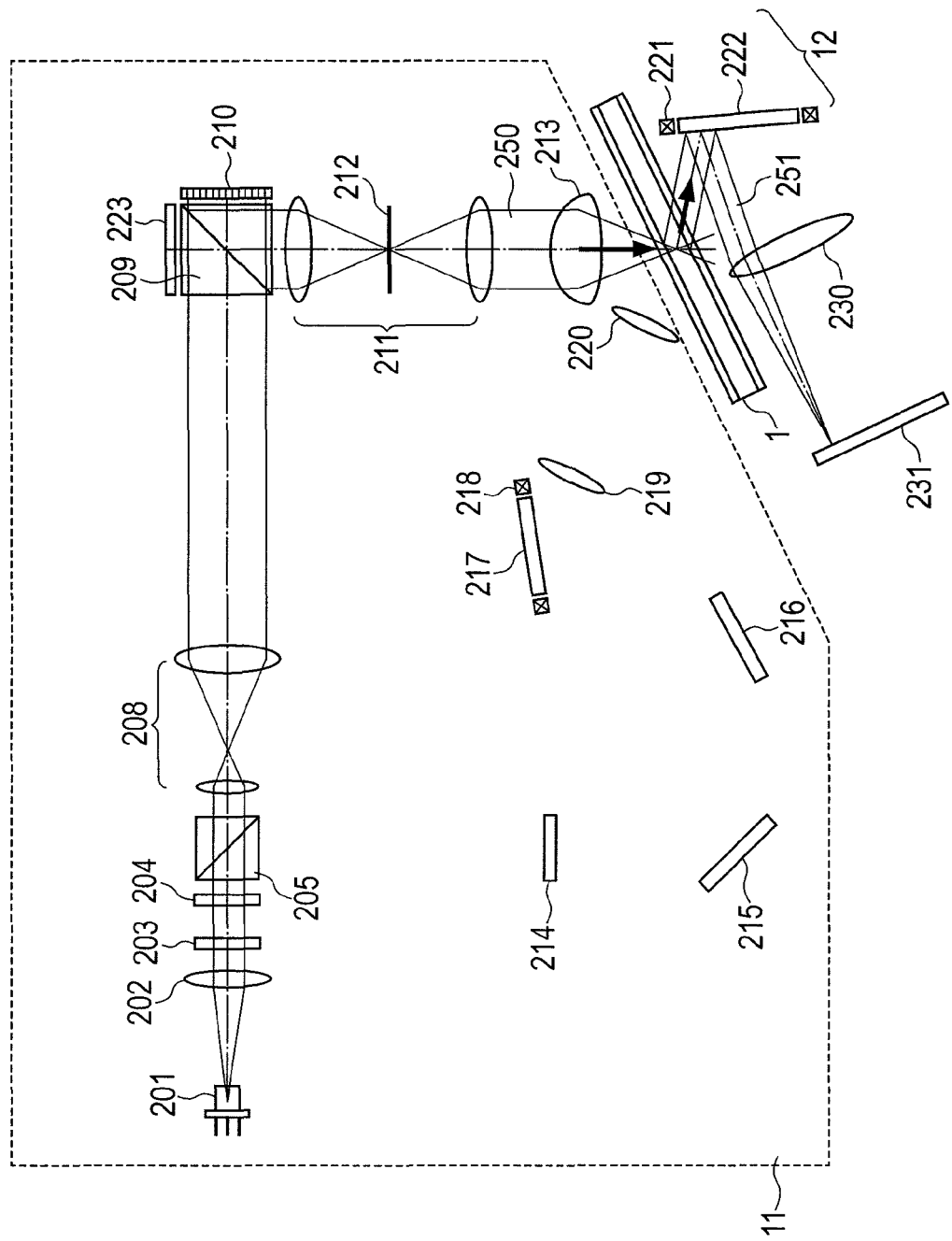
FIG. 5 is a schematic view of the pickup in the optical information recording/reproduction apparatus according to a first embodiment.

FIG. 5 illustrates an example of the optical system structure of the pickup 11 in the optical information recording/reproduction apparatus 10 according to a first embodiment. The embodiment shown in FIG. 5 has a basic optical system structure shown in FIGS. 2 and 3, which is configured to allow the galvanic mirror 222 to reflect the reference beam that has transmitted the optical information recording medium 1 so that the beam is made incidence to a lens 230 and condensed on a photodetector 231.

The appropriate reference beam angle is detected by radiating adjusting beam 250 to the optical information recording medium 1 through the light path of the signal beam while partially or fully setting pixels of the spatial light modulator 210 ON so as to diffract diffraction beam 251. The adjusting beam 250 denotes the beam to which information used for adjusting the reference beam angle is to be added or has been added (hereinafter referred to as adjusting information). It may be formed as the signal beam upon recording. The diffracted diffraction beam 251 is reflected by the galvanic mirror 222, made incidence to the lens 230, and condensed on the photodetector 231.

When recording the information in the optical information recording medium using holography, the reference beam and the signal beam to which the information has been added are interfered in the optical information recording medium. The resultant interference pattern is recorded in the optical information recording medium. The signal beam adds the information by the unit of pixel of the spatial light modulator 210, and accordingly, has the amplitude distribution which changes by the unit of pixel. If the spatial light modulator 210 is combined with the phase mask function, the signal beam also has phase distribution which changes by the unit of pixel. Meanwhile, the information is not added to the reference beam by the spatial light modulator 210. It is difficult to realize the plane wave with completely uniform amplitude distribution and phase distribution. Actually, the reference beam generally has predetermined amplitude distribution and phase distribution. Reproduction may be performed by radiating the reference beam with the same amplitude distribution and phase distribution as those derived when recording the information in the optical information recording medium to which the information has been recorded at the predetermined angle to diffract the signal beam. Generally, the amplitude distribution does not have to have the same absolute value so long as it is regarded as having relatively the same amplitude distribution.

The diffraction beam with the same amplitude distribution and phase distribution as those of the recorded reference beam may be diffracted by radiating the beam with the same amplitude distribution and phase distribution as those of the recorded signal beam instead of the reference beam. The diffraction beam with the same amplitude distribution and phase distribution as those of the reference beam upon recording may be diffracted if those distributions are at least partially the same rather than making all the information data the same as those of the signal upon recording. The larger the points with coincided amplitude distribution and the phase distribution exist, the higher the intensity of the diffraction beam becomes. The thus diffracted diffraction beam contains information of incident angle of the appropriate reference beam for recovering the signal beam.

Figure 17:
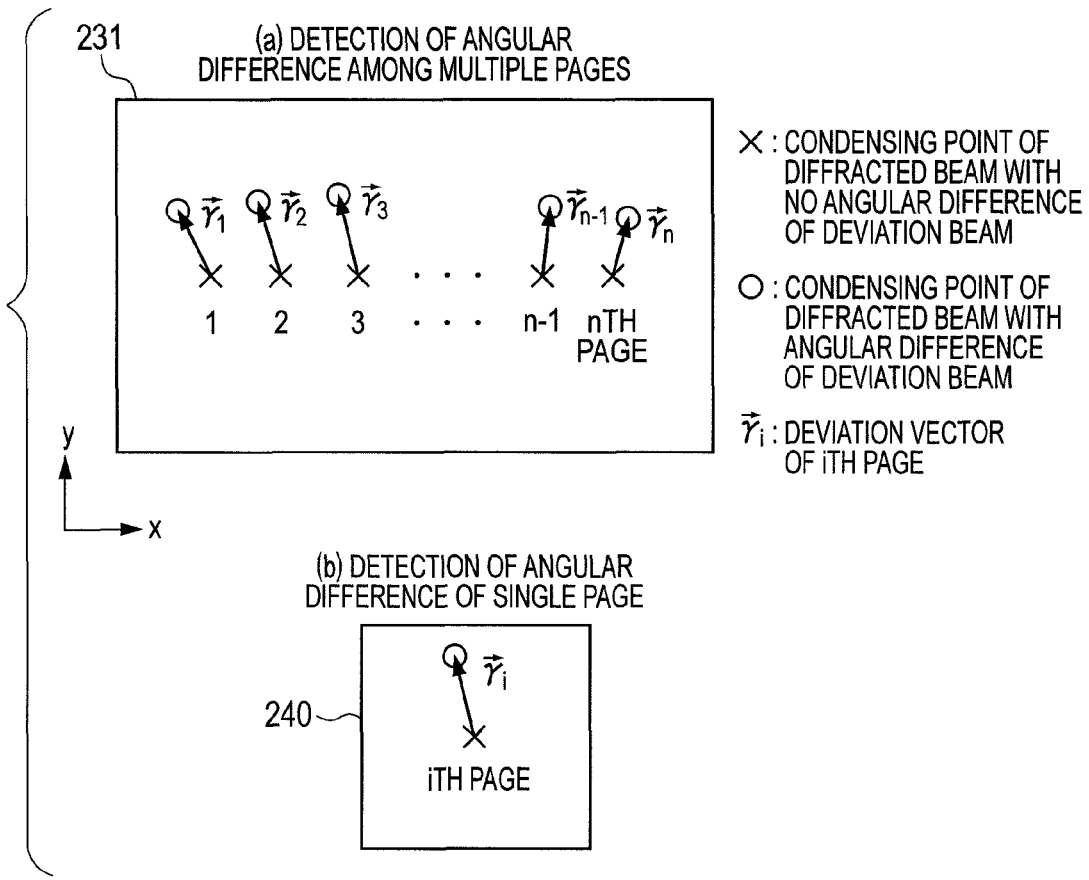
FIG. 17 is a schematic view representing bright points detected by the photodetector.

Setting all the pixels of the spatial light modulator 210 ON may diffract the diffraction beam corresponding to the angles of all the reference beams recorded through angular multiplexing on the same position of the optical information recording medium 1. The diffracted diffraction beam is condensed on the photodetector 231 by the lens 230 at the position corresponding to the angle. Positions of bright points resulting from condensing on the photodetector may be detected to provide the information of incident angle of the appropriate reference beam upon recovery. FIG. 17 schematically shows bright spots condensed on the photodetector. Referring to FIG. 17, the mark x represents the point at which the diffracted diffraction beam is condensed when the reference beam has no angular deviation. The mark o represents the point at which the diffracted diffraction beam is condensed when the reference beam has the angular deviation. The vector that indicates angular deviation of the reference beam for each page from the position x to o represents a deviation vector. Information with respect to the position at which the diffracted diffraction beam is condensed when the reference beam has no angular deviation may be calculated as the condensing point at the corresponding angle while holding the multiplexing angle table for the reference beam upon recording. The angular deviation in the multiplexing direction is revealed as the bright point deviation in x-direction, and the angular deviation in the direction orthogonal to the multiplexing direction is revealed as the bright point deviation in y-direction in the drawing, respectively.

Figure 18:
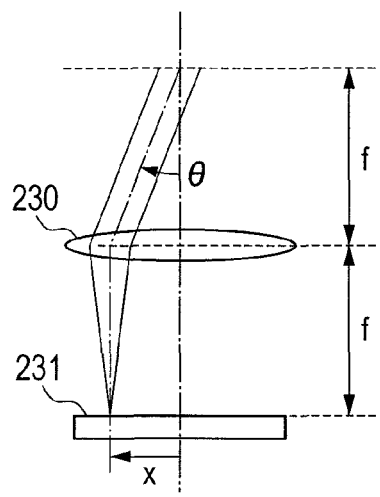
FIG. 18 is a schematic view representing a relationship between the angle of the diffraction beam which has been diffracted and the bright point detected by the photodetector.

The reason why the angular deviation information may be obtained from displacement of the bright point will be described hereinafter. As FIG. 18 shows, the center axis of the angular scan range of the reference beam is set, and the lens 230 is placed at the position apart from the position at which the signal beam on the axis is focused by the objective lens 213 by a focal point distance f. The photodetector 231 is further disposed from the lens by the focal point distance f. The center of the photodetector 231 is aligned with the axis. Assuming that the angle of the reference beam with respect to the axis is set to θ, the bright point position x on the photodetector may be expressed by the following formula (1). FIG. 18 omits the reflection by the galvanic mirror 222.

$$x = f \sin \theta \tag{1}$$

The information with respect to the angle of diffracted diffraction beam may be obtained by detecting the bright point position x using the photodetector 231. Assuming that the direction orthogonal to the position x on the detection surface of the photodetector 231 is set to y, the information with respect to the angle in the direction orthogonal to the multiplexing direction may be obtained by detecting the bright point position in the y-direction.

As described above, the signal beam may be recovered at the appropriate reference beam angle by performing the recovering operation while controlling each angle of the galvanic mirrors 217 and 222 to the desired angle based on the thus obtained angle information. In the case where the information is recorded using the phase mask, the diffraction beam is diffracted when the phase information of the optical beam radiated to the optical information recording medium 1 coincides with the phase information of the signal beam upon recording. So the phase of the signal beam upon recording has to be partially or fully aligned.

Figure 19:
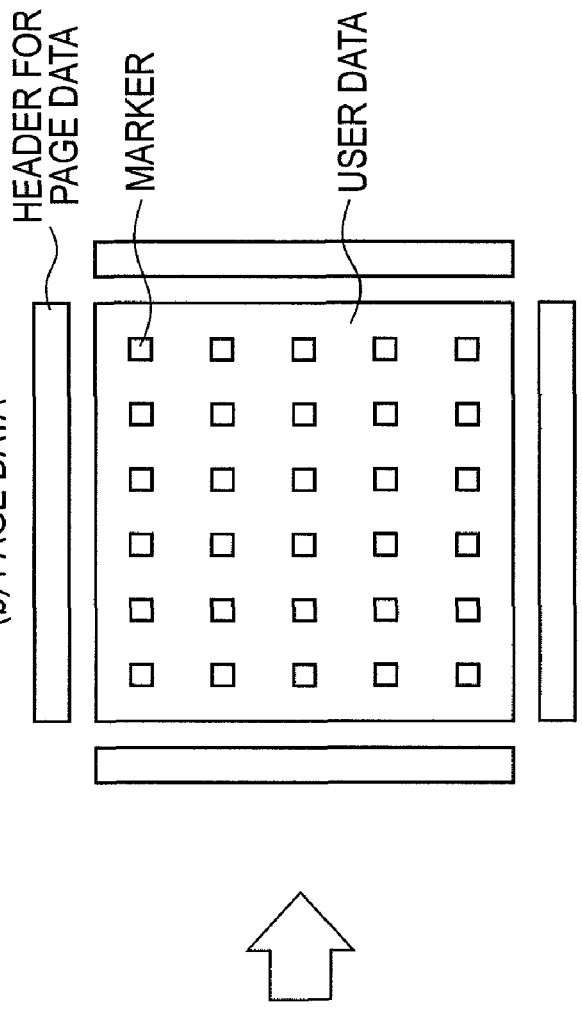
FIG. 19 is a schematic view representing page data configurations.

FIG. 19 shows an example of a page data structure. Header information is added to the user data for forming the page data. Addition of error correction code, scrambling and modulation are applied before and after the information. The data are converted into the page data to be transmitted to the spatial light modulator. The header for the page data, and markers for locating the page data are further added to the page data. In the case where the appropriate information with respect to the reference beam angle of the hologram recorded at the predetermined reference beam angle is only needed to be obtained, the adjusting information in accordance with the reference beam angle is preliminarily added to the header for page data for recording the hologram. In order to obtain the appropriate angle information, the pixel of the adjusting information corresponding to the reference beam angle is only set ON in the spatial light modulator 210 so as to diffract only one corresponding diffraction beam. As the adjusting information to be added to the header information, such information as book number, page number, and data address may be employed. Alternatively, such information as disc rotating angle, disc radius, and reference beam angle may also be added. The information in accordance with the reference beam angle may be added not only to the header for page data, but also to the marker, and inside the user data so long as the information is identified in accordance with the reference beam angle.

In the case where the diffraction beam corresponding to all the pages is diffracted while setting all the pixels in the spatial light modulator 210 ON, the bright points condensed on the photodetector 231 are overlapped with one another, which cannot be resolved. In the aforementioned case, the same adjusting information is added to the header information, for example at the predetermined angular multiplexing intervals to record the hologram. The appropriate angle information is obtained by setting only the corresponding pixel in the spatial light modulator 210 ON to diffract the diffraction beam of the corresponding hologram. This may provide the information with respect to the appropriate reference beam angle for each multiplexing number.

As the photodetector 231, the one capable of two-dimensionally detecting the optical information, for example, CMOS image sensor may be employed. Alternatively, the one capable of one-dimensionally detecting the optical information, for example, the line sensor may be employed. It is advantageous to use the photodetector capable of two-dimensionally detecting the optical information because the information of the appropriate reference beam angle not only in the angular multiplexing direction but also in the direction orthogonal thereto may be obtained. The pixel size of the photodetector 231 may be set to the one corresponding to the angular resolution required for appropriately controlling the reference beam angle. Alternatively, the larger pixel may be used so long as the required angular resolution is obtained by calculating the gravity center of the bright point using the position information and the bright point information for each pixel of the photodetector 231. The resolution for detecting the angle information may be increased through enlarged system by increasing the focal point distance of the lens 230 as necessary.

Figure 15:
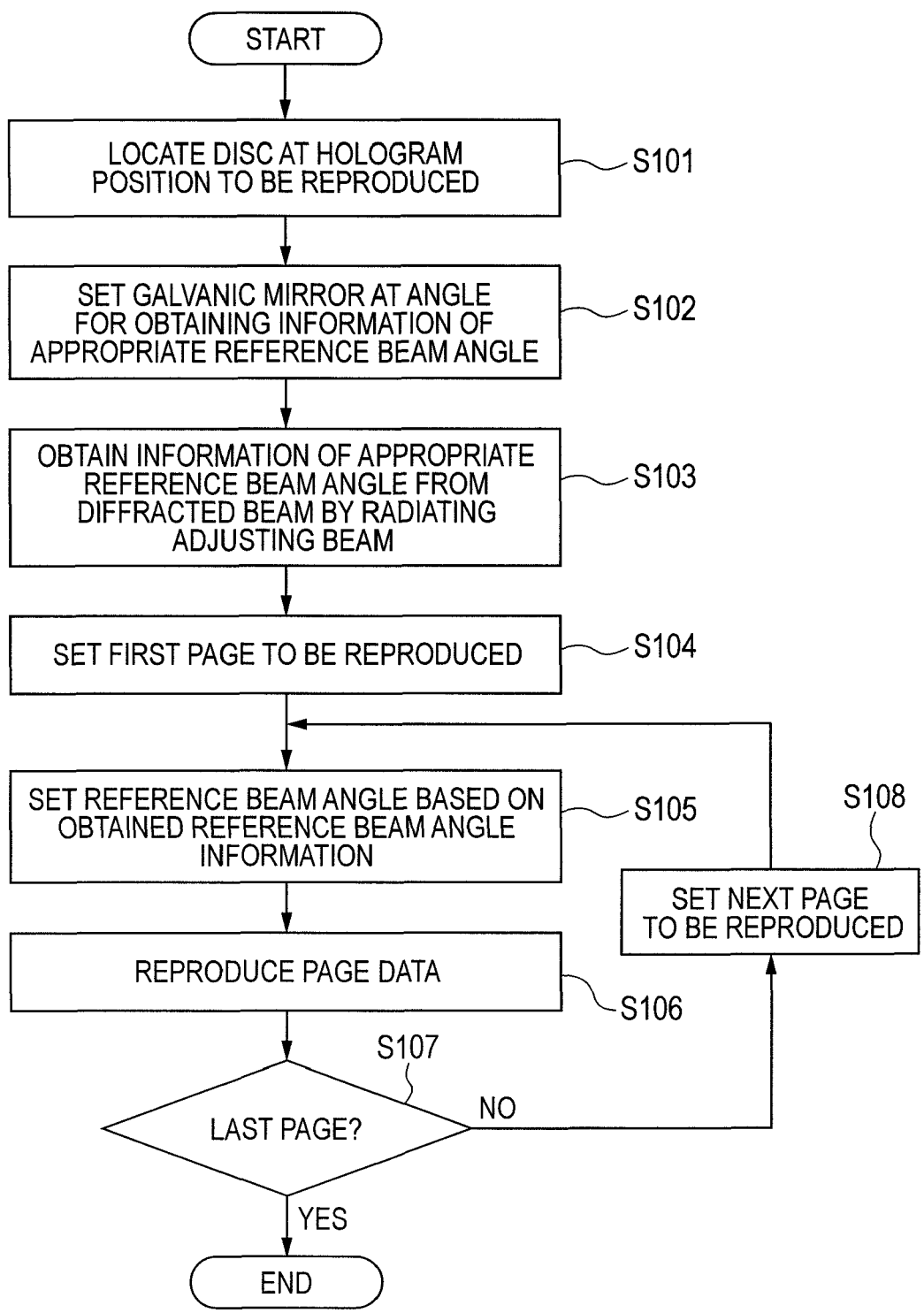
FIG. 15 is a schematic view representing a process flow executed by the optical information recording/reproduction apparatus.

An exemplary operation for detecting the appropriate reference beam angle is shown in FIG. 15. In step 101, the disc rotating motor control circuit 88 and the access control circuit 81 are controlled to position the disc so that the hologram to be reproduced faces the objective lens. In step 102, angle of the galvanic mirror 222 is set so that the diffractive beam 251 diffracted by exposing the optical information recording medium 1 which records the information with the adjusting beam 250 which is at least partially the same as the signal beam upon recording transmits the lens 230, and is condensed on the photodetector.

In step 103, the hologram recorded in the optical information recording medium 1 is exposed with the adjusting beam which is at least partially the same as the signal beam upon recording for diffracting the diffraction beam 251. The information with respect to appropriate reference beam angle is obtained from the photodetector 231. In step 104, the first page data in the book are set for reproduction. In step 105, each angle of the galvanic mirrors 217 and 222 is set based on the appropriate reference beam angle information obtained in step 103. In step 106, the reference beam is radiated to the hologram recorded in the optical information recording medium 1 to recover the signal beam. In step 107, it is determined whether the reproduced page data correspond to the last page of the hologram having the page data multiplexed. If it is determined that the data correspond to the last page, the process for reproducing the multiplexed hologram ends. If subsequent page exists, the process proceeds to step 108 where the subsequent page is set for reproduction.

Information with respect to all the appropriate reference beam angles may be collectively obtained prior to reproduction of the multiplex recorded hologram. Alternatively, as necessary, the information of appropriate reference beam angle may be obtained only when the signal quality is degraded to be equal to or smaller than the predetermined value during sequential reproduction of the multiplexed holograms.

In consideration of compatibility of the optical information recording/reproduction apparatus or the optical information recording medium, if the relative positional relationship or angular relationship between the optical beam and the optical information recording medium 1 has to be aligned when exposing the optical information recording medium 1 with the optical beam for detecting the appropriate reference beam angle, the mechanism capable of adjusting position and angle of the optical information recording medium 1 or the pickup 11 may be combined with the optical information recording/reproduction apparatus 10 or the pickup 11.

(Second Embodiment)

Figure 6:
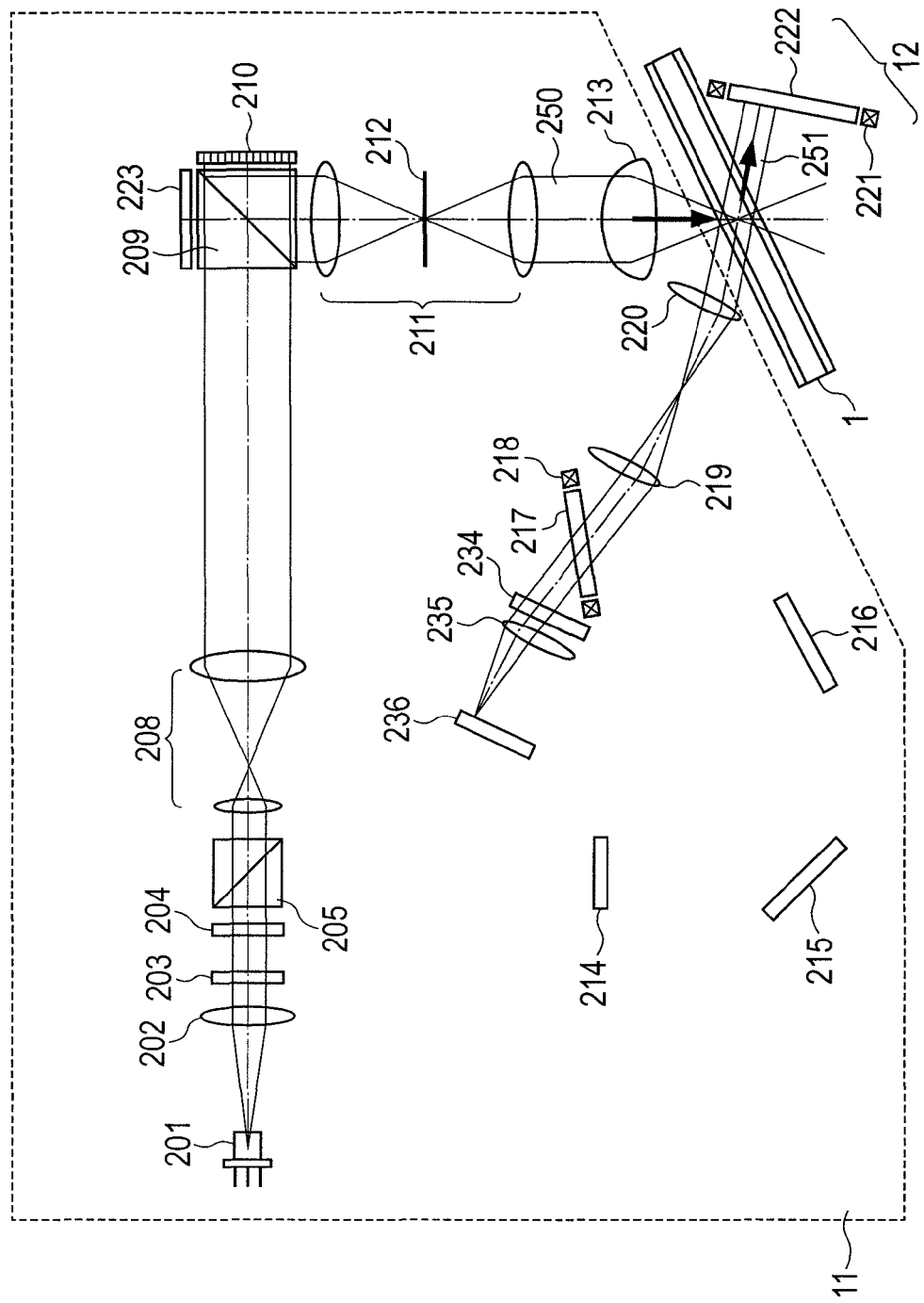
FIG. 6 is a schematic view of the pickup in the optical information recording/reproduction apparatus according to a second embodiment.

FIG. 6 shows an example of the optical system structure of the pickup 11 in the optical information recording/reproduction apparatus 10 according to a second embodiment. As the embodiment shown in FIG. 6, the basic optical structure shown in FIGS. 2 and 3 is provided with a variable polarized filter 234, a lens 235, and a photodetector 236 on a back surface of the galvanic mirror 217 for detecting the diffraction beam so as to obtain the information with respect to the angle of the reference beam that has been reflected by the galvanic mirror 222. In this embodiment, reproduction and adjusting operations may be performed simultaneously. FIG. 6 shows only the beam required for performing the adjusting operation.

In the case where the appropriate reference beam angle is detected, the adjusting beam 250 is radiated to the optical information recording medium 1 through the optical path of the signal beam while setting a part of or all the pixels of the spatial light modulator 210 ON so as to diffract the diffraction beam 251. The diffracted diffraction beam 251 is reflected by the galvanic mirror 222, and then made incidence to the optical information recording medium 1 again to transmit the lenses 220 and 219. In this case, the galvanic mirror 217 is configured to partially transmit the beam. The diffracted diffraction beam transmits the mirror 217. The diffracted diffraction beam 251 further transmits the variable polarized filter 234, is made incidence to the lens 235, and is condensed on the photodetector 236. Likewise the first embodiment, the diffracted diffraction beam angle information may be detected by the photodetector 236 as the position information. Based on the information detected by the photodetector 236, the angle of the galvanic mirror 217 may be controlled to the appropriate reference beam angle. The method for using the spatial light modulator 210, and the structure of the photodetector 236 for detecting the appropriate reference beam angle are the same as those described in the first embodiment, and explanations thereof, thus will be omitted.

The galvanic mirror 217 may be configured to partially transmit the beam as described above, or configured to electrically switch the state of the beam between transmission and reflection.

In the case where the variable polarized filter 234 is configured to transmit only the s-polarized component, the diffracted diffraction beam 251 for detecting the appropriate reference beam angle has the s-polarized component may be detected accordingly. Meanwhile, the reference beam 207 used for reproducing the normal signal reflects on the PBS prism 205, and is set to the p-polarized component by the polarization direction transformation device 214. It further reflects on the galvanic mirror 217 via the mirrors 215 and 216. The reflecting reference beam transmits the lenses 219 and 220, and is made incidence to the optical information recording medium 1. It is reflected by the galvanic mirror 222 and is made incidence to the optical information recording medium 1 again to diffract the signal beam 206. At this time, the reference beam partially passes through the lenses 220 and 219 again, and transmits the galvanic mirror 217. However, the beam as the p-polarized component cannot transmit the variable polarized filter 234. The embodiment allows the appropriate reference beam angle to be detected in parallel with the normal reproduction operation.

If the variable polarized filter 234 is configured to transmit only the p-polarized component, the normal reference beam reflecting as the phase conjugate beam may be detected. This may be used for correcting the angle of the galvanic mirror 217.

Figure 16:
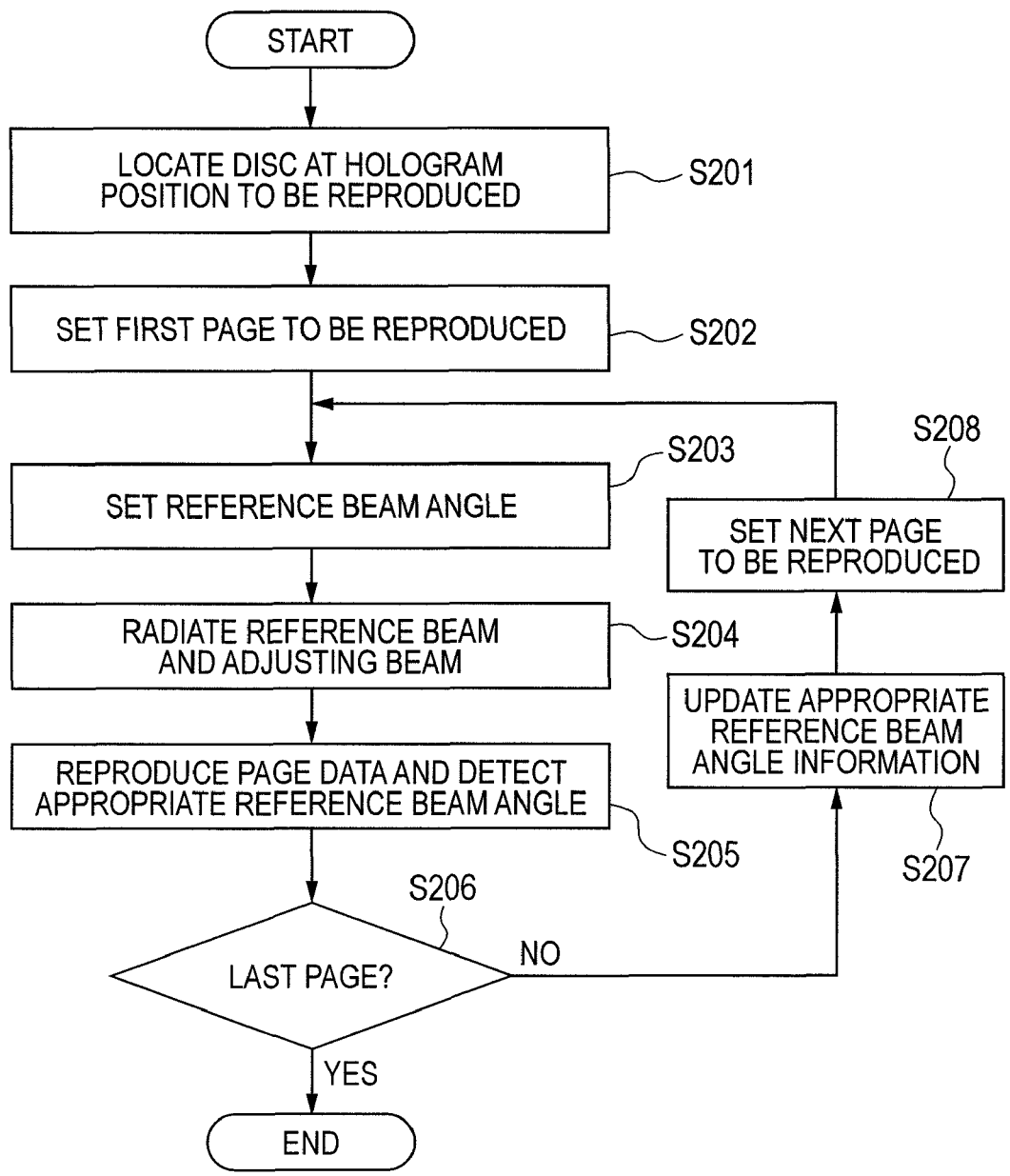
FIG. 16 is a schematic view representing a process flow executed by the optical information recording/reproduction apparatus.

An example of the operation for detecting the appropriate reference beam angle is shown in FIG. 16. In S201, the disc is positioned by controlling the disc rotating motor control circuit 88 and the access control circuit 81 so that the hologram to be reproduced faces the objective lens. In S202, the first page data in the book are set for reproduction. In S203, each angle of the galvanic mirrors 217 and 222 is set. In S204, the reference beam 207 and the adjusting beam 250 which is at least partially the same as the signal beam upon recording are radiated to the hologram recorded in the optical information recording medium 1 for recovering the signal beam 206 recovered by the reference beam 207. The diffraction beam 251 is diffracted by the adjusting beam 250 which is at least partially the same as the signal beam upon recording. The diffracted diffraction beam 251 is detected by the photodetector 236 to detect the appropriate reference beam angle. In step 206, it is determined whether the reproduced page data correspond to the last page of the multiplexed hologram. If it is the last page, reproduction of the book ends. If the subsequent page exists, the process proceeds to step 207 where the information with respect to the appropriate reference beam angle is updated. Then in step 208, the subsequent page is set for reproduction.

The operation for detecting the appropriate reference beam angle may be performed for all the page data as described above. The operation may be performed only when the signal quality is degraded to be equal to or smaller than the predetermined value. The operation may be performed for each of the predetermined number of pages. The operation may be started or finished at the predetermined page.

In the embodiment, the adjusting beam which is at least partially the same as the signal beam upon recording is radiated simultaneously with radiation of the reference beam. This makes it possible to reflect the information with respect to the angular deviation of the detected reference beam in reproduction of the subsequent multiplexed hologram.

(Third Embodiment)

Figure 7:
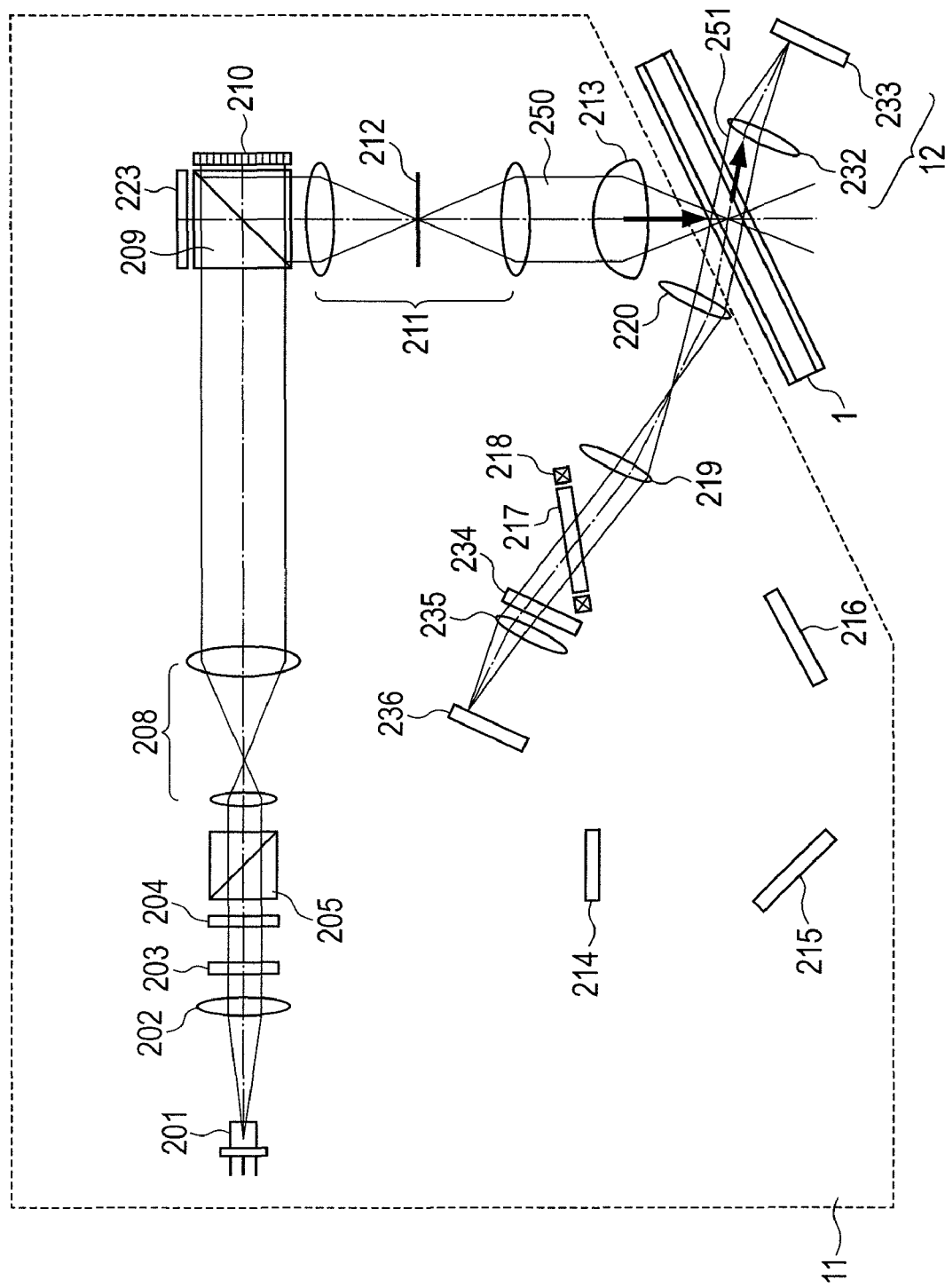
FIG. 7 is a schematic view of the pickup in the optical information recording/reproduction apparatus according to a third embodiment.

FIG. 7 shows a first modified example of the optical system structure of the pickup 11 in the optical information recording/reproduction apparatus 10 according to the second embodiment. The structure shown in FIG. 7 is provided with a lens 232 and a mirror 233 instead of the galvanic mirror 222 and the actuator 221 in the optical system structure shown in FIG. 6. The reference beam which has transmitted the optical information recording medium 1 upon reproduction is made incidence to the lens 232, and condensed on the mirror 233. The reference beam which has been reflected by the mirror 233 is radiated to the hologram recorded in the optical information recording medium 1 again as the phase conjugate beam.

In the case where the appropriate reference beam angle is detected, the adjusting beam 250 is radiated to the optical information recording medium 1 through the optical path of the signal beam while setting a part of or all the pixels of the spatial light modulator 210 ON so as to diffract the diffraction beam 251. The diffracted diffraction beam 251 is made incidence to the lens 232, and condensed on a mirror 233. The diffraction beam 251 reflecting from the mirror 233 is made incidence to the lens 232. It is made incidence to the optical information recording medium 1 again. It transmits the lenses 220, 219, the galvanic mirror 217, the polarized filter 234, and the lens 235 to be condensed on the photodetector 236. The reason why the photodetector 236 is able to detect the appropriate reference beam angle, the method for using the spatial light modulator 210 for detecting the appropriate reference beam angle, and the structure of the photodetector 236 are common to the second embodiment, and explanations thereof, thus will be omitted.

The operation as an example shown in FIG. 15 likewise the first embodiment may be applied to detection of the appropriate reference beam angle. The structure of this embodiment is provided with the mirror 233 instead of the galvanic mirror 222 as described in the first embodiment. Accordingly, setting of only the galvanic mirror 217 in step 102 may be sufficient.

In the embodiment, all the diffracted diffraction beams are subjected to reproduction even in the case where the diffraction beams corresponding to a plurality of angular multiplexing angles, respectively are simultaneously diffracted. This makes it possible to make the diffraction beam incidence to the hologram again, thus providing a plurality of information data with respect to the appropriate reference beam angles.

(Fourth Embodiment)

Figure 8:
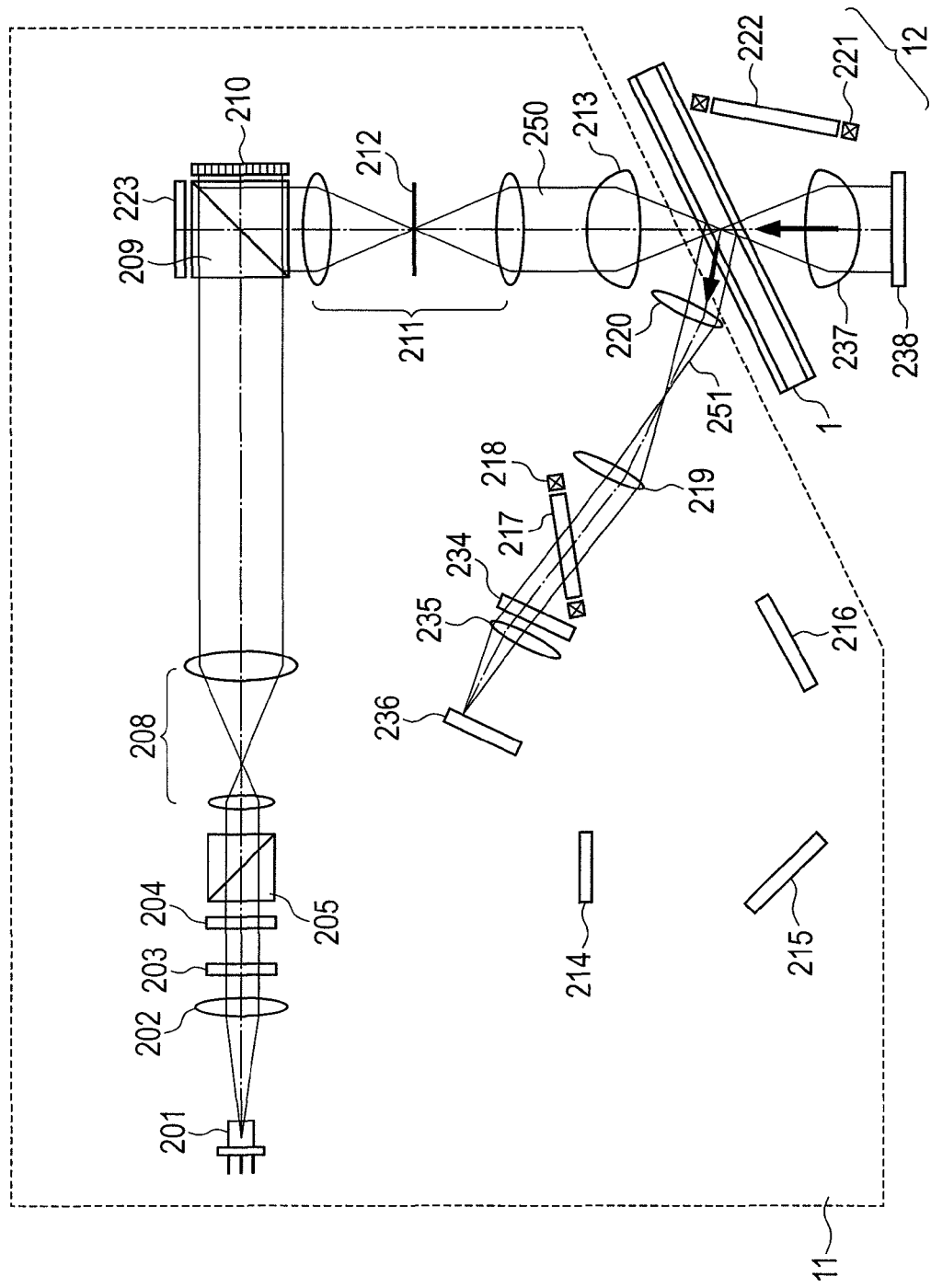
FIG. 8 is a schematic view of the pickup in the optical information recording/reproduction apparatus according to a fourth embodiment.

FIG. 8 shows a second modified example of the optical system structure of the pickup 11 in the optical information recording/reproduction apparatus 10 according to the second embodiment. The structure shown in FIG. 8 is formed by adding a lens 237 and a mirror 238 on the optical path of the signal beam to the optical system structure shown in FIG. 6.

In the case where the appropriate reference beam angle is detected, the adjusting beam 250 is radiated to the optical information recording medium 1 through the optical path of the signal beam while setting a part of or all the pixels of the spatial light modulator 210 ON. The adjusting beam 250 which has transmitted the optical information recording medium 1 is made incidence to the objective lens, and reflected by the mirror 238. The beam 250 reflecting from the mirror 238 is made incidence to the objective lens 237 again and radiated to the optical information recording medium 1 to diffract the diffracting beam 251. The diffracted diffraction beam 251 transmits the lenses 220, 219, the galvanic mirror 217, the polarized filter 234, and the lens 235 to be condensed on the photodetector 236. The reason why the photodetector 236 is able to detect the appropriate reference beam angle, the method for using the spatial light modulator 210 for detecting the appropriate reference beam angle, and the structure of the photodetector 236 are common to the second embodiment, and explanations thereof, thus will be omitted.

The operation as an example shown in FIG. 15 likewise the first embodiment may be applied to the detection of the appropriate reference beam angle. In the modified example, the galvanic mirror 222 is not used for detecting the appropriate reference beam angle. Accordingly, setting of only the galvanic mirror 217 in step 102 may be sufficient.

According to the embodiment, the diffraction beam is diffracted from the optical recording information medium 1 in the direction of the lens 220. This makes it possible to provide the information with respect to a plurality of appropriate reference beam angles simultaneously.

(Fifth Embodiment)

Figure 9:
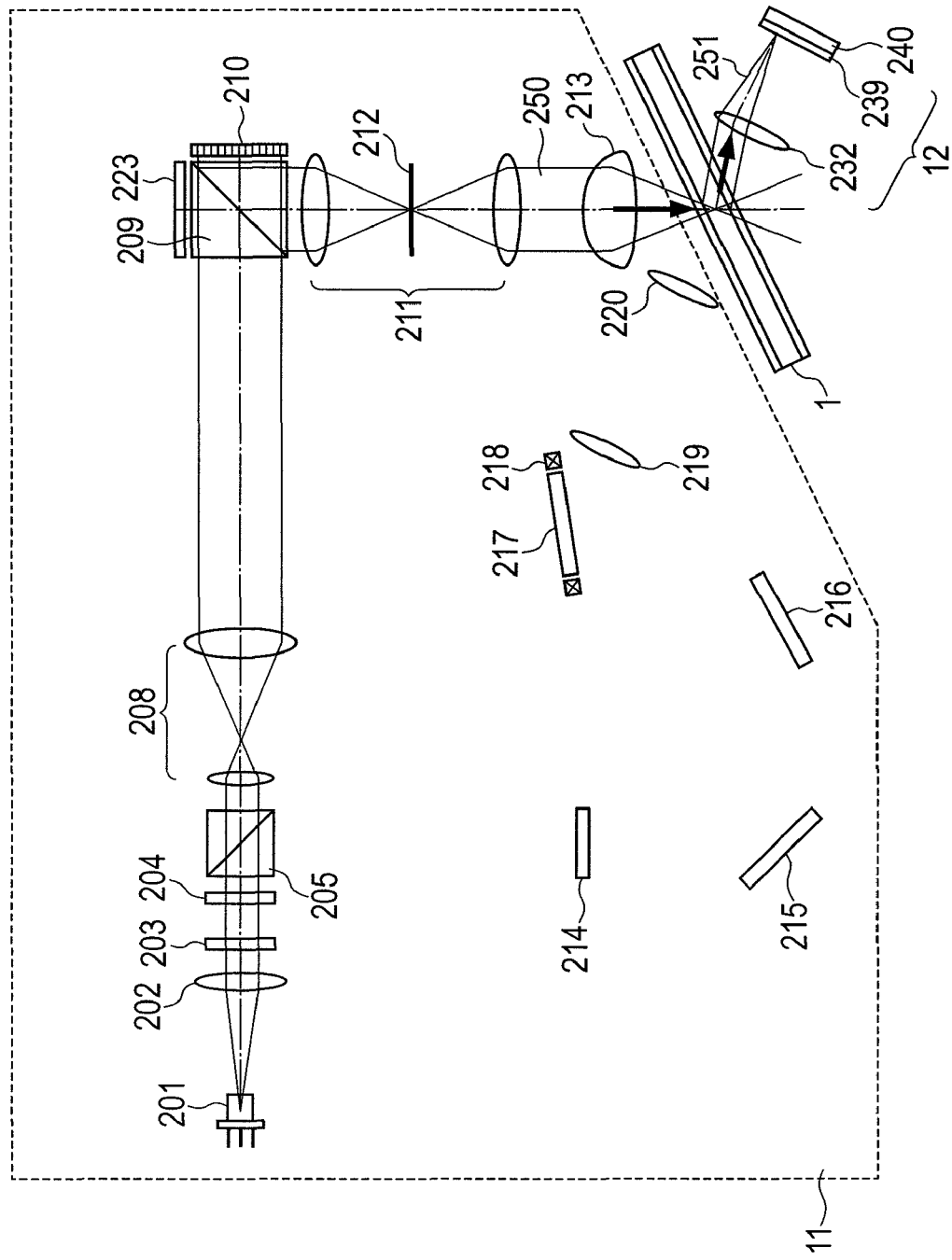
FIG. 9 is a schematic view of the pickup in the optical information recording/reproduction apparatus according to a fifth embodiment.

FIG. 9 shows an example of the optical system structure of the pickup 11 in the optical information recording/reproduction apparatus 10 according to the third embodiment. The structure shown in FIG. 9 is formed by adding a lens 232, a transmission/reflection variable element 239 which is capable of electrically switching the state of the beam between transmission and reflection, and a photodetector 240 to the basic optical system structure shown in FIGS. 2 and 3 instead of the galvanic mirror 222 and the actuator 221. Upon reproduction, the transmission/reflection variable element 239 is switched to be in the reflection state upon reproduction. The reference beam which has transmitted the optical information recording medium 1 is made incidence to the lens 232, and is radiated to the hologram recorded in the optical information recording medium 1 again as the phase conjugate beam reflecting from the transmission/reflection variable element 239 for recovering the signal beam.

In the case where the appropriate reference beam angle is detected, the adjusting beam 250 is radiated to the optical information recording medium 1 through the optical path of the signal beam while setting a part of or all the pixels of the spatial light modulator 210 ON to diffract the diffraction beam 251. The transmission/reflection variable element 239 is kept in the transmission state to allow the diffracted diffraction beam 251 to be made incidence to the lens 232. It transmits the transmission/reflection variable element 239, and is condensed on a photodetector 240. The reason why the photodetector 240 is able to detect the appropriate reference beam angle, the method for using the spatial light modulator 210 for detecting the appropriate reference beam angle, and the structure of the photodetector 240 are common to the first embodiment, and explanations thereof, thus will be omitted.

The operation as an example shown in FIG. 15 likewise the first embodiment may be applied to detection of the appropriate reference beam angle. In the embodiment, the transmission/reflection variable element 239 is provided instead of the galvanic mirror 222. Accordingly, setting of only the galvanic mirror 217 in step 102 may be sufficient.

According to the embodiment, even in the case where the diffraction beams corresponding to a plurality of angular multiplexing angles are simultaneously diffracted, information with respect to a plurality of appropriate reference beam angles may be obtained simultaneously.

(Sixth Embodiment)

Figure 10:
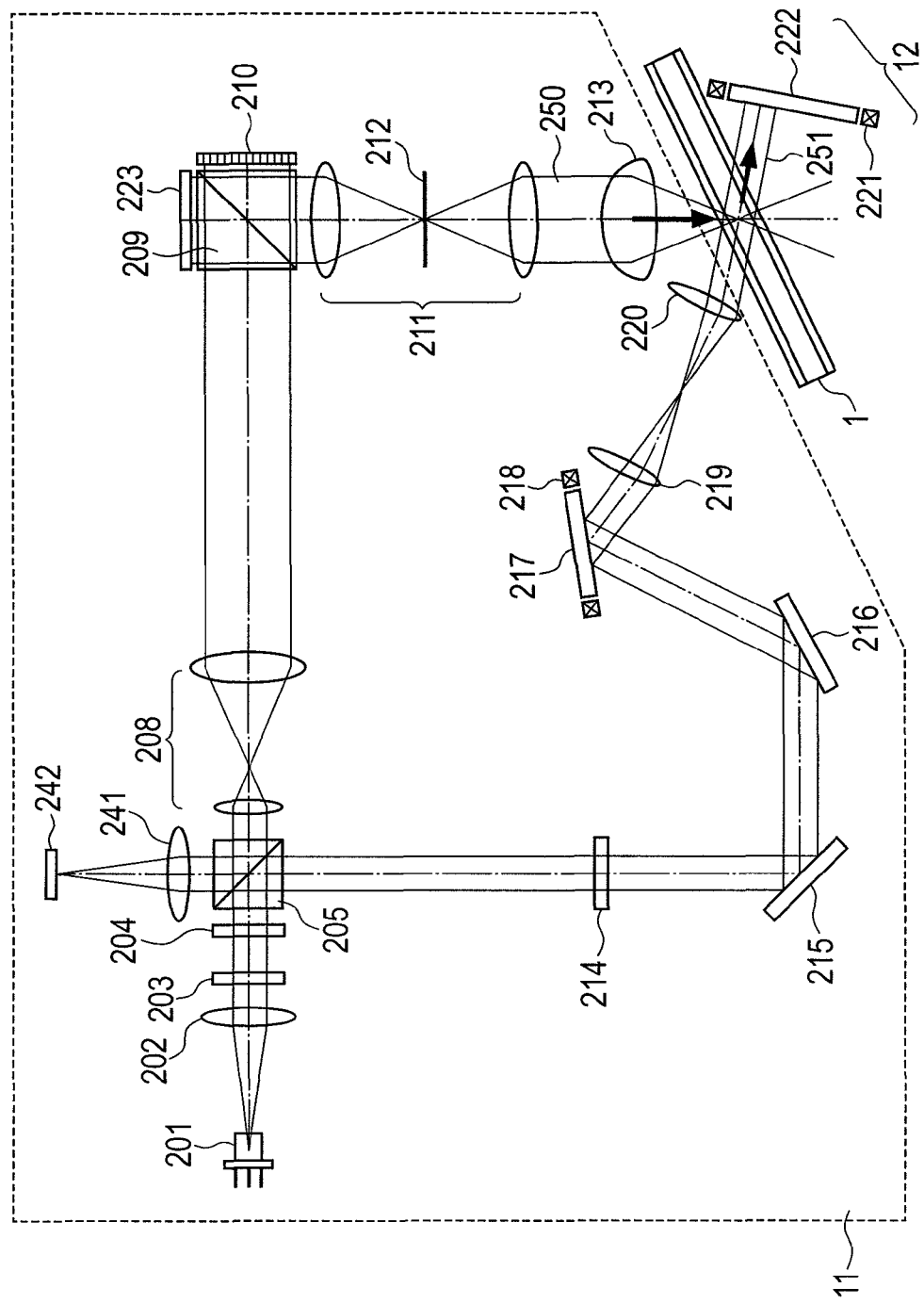
FIG. 10 is a schematic view of the pickup in the optical information recording/reproduction apparatus according to a sixth embodiment.

FIG. 10 shows the optical system structure of the pickup 11 in the optical information recording/reproduction apparatus 10 according to a fourth embodiment. The structure shown in FIG. 10 is formed by adding the structure in which the optical beam reflecting from the galvanic mirror 222 returns to the light path of the reference beam, transmits the PBS prism 205, is made incidence to the lens 241, and condensed on the photodetector 242 to the basic optical structure shown in FIGS. 2 and 3.

In the case where the appropriate reference beam angle is detected, the adjusting beam 250 is radiated to the optical information recording medium 1 through the optical path of the signal beam while setting a part of or all the pixels of the spatial light modulator 210 ON to diffract the diffraction beam 251. The diffracted diffraction beam 251 is reflected by the galvanic mirror 222, and is made incidence to the optical information recording medium 1 again. It then transmits the lenses 220 and 219, is reflected by the galvanic mirrors 217 and the mirrors 216 and 215, and transmits the polarizing direction conversion element 214 and the PBS prism 205. It is made incidence to the lens 241 and condensed on the photodetector 242.

It is assumed that the relationship between the galvanic mirrors 217 and 222 is controlled so that the reference beam for reproducing the information returns through the optical path of the reference beam coaxially after reflecting from the galvanic mirror 222 at an arbitrary angle which allows the galvanic mirror 217 to conduct angular multiplexing. Supposing that the galvanic mirrors 217 and 222 are set at angles corresponding to the hologram at multiplexing angles to be reproduced, if the angle of the diffraction beam diffracted from the hologram at the multiplexing angle deviates from the reference beam angle upon recording, the beam is expected to be made incidence to the PBS prism 205 while having the angular deviation doubled. By making the diffraction beam with the angular deviation incidence to the lens 241 and condensing the beam on the photodetector 242, the angular deviation may be detected as displacement of the condensing point from the center of the photodetector as shown in FIG. 17(*b*). Based on the information detected by the photodetector 242, the angular control of the galvanic mirrors 217 and 222 is conducted for setting the appropriate reference beam angle.

Referring to the structure shown in FIG. 10, if there is no angular deviation of the diffraction beam diffracted from the optical information recording medium 1, the diffracted diffraction beam is always condensed on the single point of the photodetector 242 with respect to the multiplexing angle upon recording. If there is the angular deviation, the diffraction beam is condensed on the position apart from the single point on the photodetector 242 as described above. Detecting only of the displacement from the single point may be sufficient, thus simplifying the photodetector structure.

The reason why the reference beam for normal information reproduction and the diffraction beam diffracted for detecting the appropriate reference beam angle are separable will be described. The reference beam for normally reproducing the information emitted from a light source 201 is brought into the s polarized component so as to be reflected by the PBS prism 205. The signal beam recovered from the hologram recorded in the optical information recording medium 1 has to be brought into the p-polarized component as it is required to transmit the PBS prism 209 for detection by the photodetector 223. For this, the reference beam as the s-polarized component that has once reflected from the PBS prism 205 is converted into the p-polarized component by the polarizing direction conversion element 214 for reproducing the information. The reference beam for reproducing the information reflecting from the galvanic mirror 222 partially returns to the optical path of the reference beam. However, it is brought into the s-polarized component again by the polarizing direction conversion element 214, and reflected by the PBS prism 205. Accordingly, the reference beam for reproducing the information is never made incidence to the photodetector 242. Meanwhile, the optical beam for detecting the appropriate reference beam angle as the s-polarized component is reflected by the PBS prism 209. So the diffraction beam diffracted by the optical beam also becomes the s-polarized component. The diffracted diffraction beam is reflected by the galvanic mirror 222, and proceeds through the optical path of the reference beam towards the PBS prism 205. It is then converted from the s-polarized component to the p-polarized component by the polarizing direction conversion element 214. It then transmits the PBS prism 205 and may be made incidence to the photodetector 242.

As described above, the reference beam for normally reproducing the information and the diffraction beam diffracted to detect the appropriate reference beam angle may be used simultaneously. This makes it possible to reproduce the information simultaneously with detection of the appropriate reference beam angle.

The method for using the spatial light modulator 210 for detecting the appropriate reference beam angle is the same as the one described in the first embodiment, and explanation thereof, thus will be omitted.

The operation as an example shown in FIG. 16 likewise the second embodiment may be applied to detection of the appropriate reference beam angle. This embodiment is different in the use of the photodetector 242 for detecting the appropriate reference beam angle instead of the photodetector 236.

(Seventh Embodiment)

Figure 11:
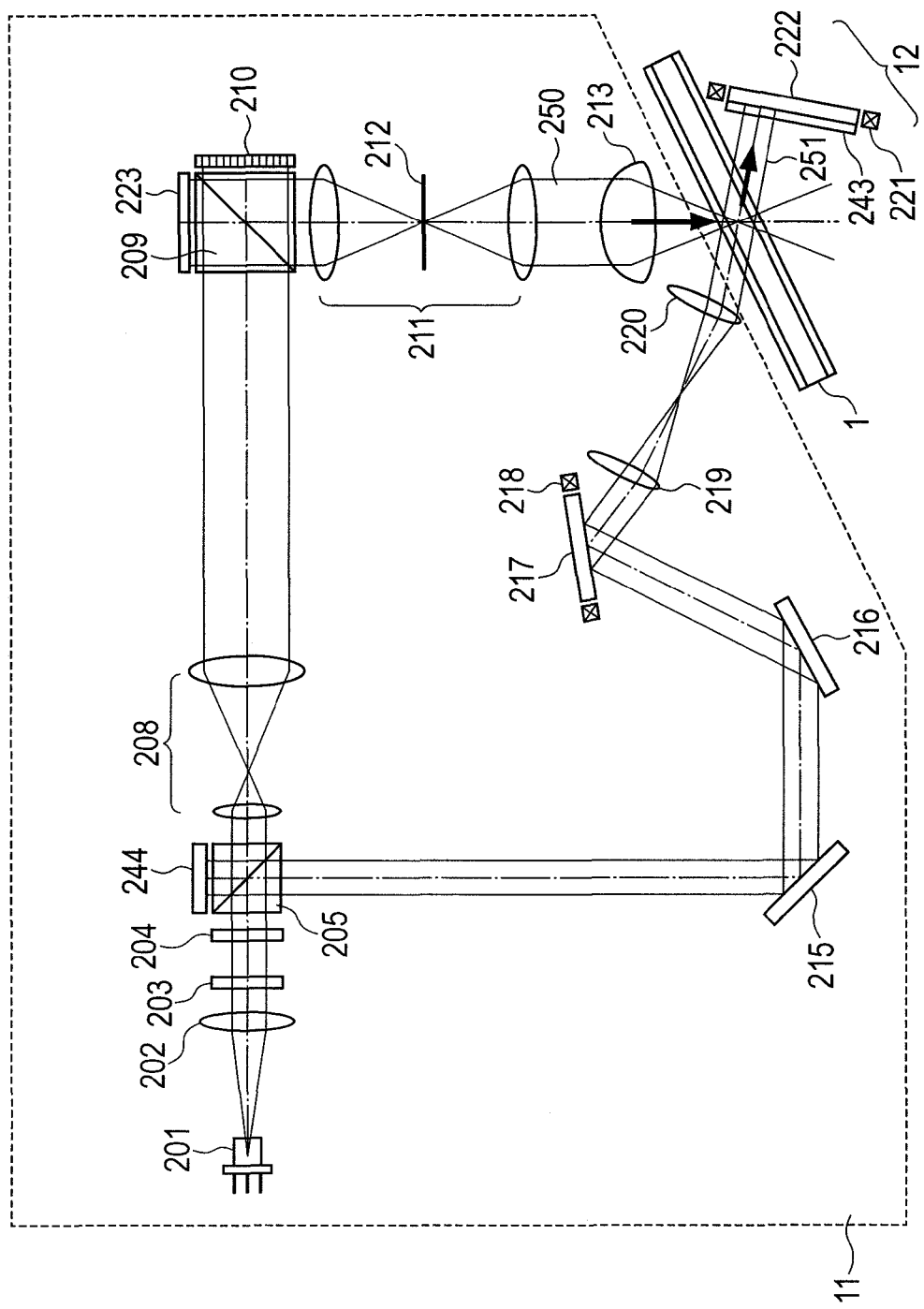
FIG. 11 is a schematic view of the pickup in the optical information recording/reproduction apparatus according to a seventh embodiment.

FIG. 11 shows the optical system structure of the pickup 11 in the optical information recording/reproduction apparatus 10 according to the fifth embodiment. The structure shown in FIG. 11 is formed by providing the basic optical system structure shown in FIGS. 2 and 3 with the structure in which a quarter-wavelength plate 243 is disposed between the optical information recording medium 1 and the galvanic mirror 222, and a photodetector 244 is further provided downstream of passage of the optical beam reflecting from the galvanic mirror 222 to returns to the optical path of the reference beam, and transmit the PBS prism 205. In the embodiment, it is possible to omit the polarizing direction conversion element 214 shown in FIGS. 2 and 3.

In the case where the appropriate reference beam angle is detected, the adjusting beam 250 is radiated to the optical information recording medium 1 through the optical path of the signal beam while setting a part of or all the pixels of the spatial light modulator 210 ON to diffract the diffraction beam 251. The diffracted diffraction beam 251 transmits the quarter-wavelength plate 243, is reflected by the galvanic mirror 222, transmits the quarter-wavelength plate 243 again, and is made incidence to the optical information recording medium 1. It transmits the lenses 220 and 219, is reflected by the galvanic mirror 217, and the mirrors 216 and 215, transmits the PBS prism 205, and is made incidence to the photodetector 244.

It is assumed that the relationship between the galvanic mirrors 217 and 222 is controlled so that the reference beam for reproducing the information returns through the optical path of the reference beam coaxially after reflecting from the galvanic mirror 222 at an arbitrary angle which allows the galvanic mirror 217 to conduct angular multiplexing. Supposing that the galvanic mirrors 217 and 222 are set at angles corresponding to the hologram at multiplexing angle to be reproduced, if the angle of the diffraction beam diffracted from the hologram at the multiplexing angle deviates from the reference beam angle upon recording, the beam is made incidence to the PBS prism 205 while having the angular deviation doubled. By making the reference beam with the angular deviation and the reference beam for reproducing the information incidence to the photodetector 244 while being in the interference state, it is possible to detect the angular deviation as the interference pattern. Based on the information detected by the photodetector 244, angles of the galvanic mirrors 217 and 222 are controlled to allow setting of the reference beam angle to the appropriate value. Use of the image pickup device such as CMOS image sensor allows detection of the interference pattern. The embodiment allows highly accurate detection by detecting the angular deviation of the reference beam as the interference pattern.

The reason why the photodetector 244 is capable of detecting the angular deviation as the interference pattern will be described. The reference beam for normally reproducing the information that has been emitted from the light source 201 is brought into the s-polarized component so as to be reflected by the PBS prism 205. Upon reproduction, the reference beam for reproducing the information transmits the optical information recording medium 1, and the quarter-wavelength plate. It is circularly polarized, reflects on the galvanic mirror 222. It then transmits the quarter-wavelength plate again to be brought into the p-polarized component. The beam is then made incidence to the hologram recorded in the optical information recording medium 1. The thus recovered signal beam as the p-polarized component transmits the PBS prism 209, and is detected by the photodetector 223. The reference beam partially transmits the optical information recording medium 1, and returns to the optical path of the reference beam as the p-polarized component. It then transmits the PBS prism 205.

Meanwhile, the optical beam radiated to the optical information recording medium 1 for detecting the appropriate reference beam angle is brought into the s polarized component which is reflected by the PBS prism 209. So the diffraction beam diffracted by the aforementioned optical beam is brought into the s-polarized component as well. The diffracted diffraction beam transmits the quarter-wavelength plate and is circularly polarized. It is then reflected by the galvanic mirror 222, transmits the quarter-wavelength plate again, and is brought into the p-polarized component. The beam proceeds through the optical path of the reference beam toward the PBS prism 205. In this way, the thus diffracted diffraction beam as the p-polarized component transmits the PBS prism 205. The reference beam for reproducing information and the diffracted diffraction beam both as p-polarized components interfere with each other, and transmit the PBS prism 205. The resultant interference pattern may be detected by the photodetector 242. The cycle and direction of the interference pattern vary in accordance with the angular deviation between the reference beam for reproducing information and the diffracted diffraction beam. This makes it possible to detect the angular deviation with respect to the diffracted diffraction beam.

As described above, the reference beam for normally reproducing information and the diffraction beam diffracted for detecting the appropriate reference beam angle may be used simultaneously. This makes it possible to reproduce the information simultaneously with detection of the appropriate reference beam angle.

The method for using the spatial light modulator 210 for detecting the appropriate reference beam angle is common to the description in the first embodiment, and explanation thereof, thus will be omitted.

The operation as an example shown in FIG. 16 likewise the second embodiment may be applied to detection of the appropriate reference beam angle. This embodiment is different in the use of the photodetector 244 for detecting the appropriate reference beam angle instead of the photodetector 236.

(Eighth Embodiment)

Figure 12:
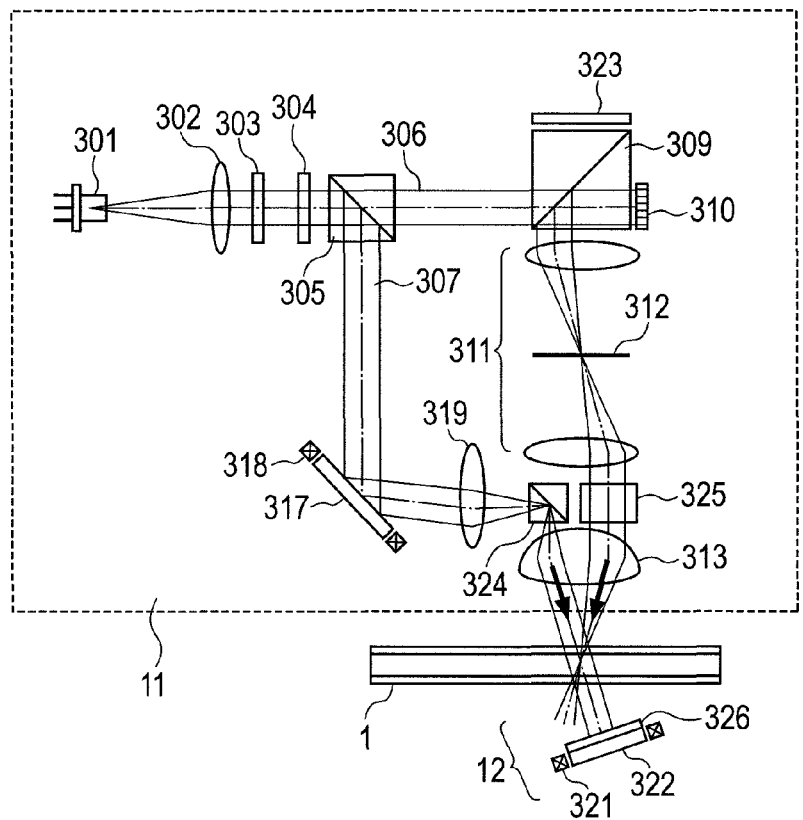
FIG. 12 is a schematic view representing recording principle of the pickup in the optical information recording/reproduction apparatus according to an eighth embodiment.

FIG. 12 represents recording principle of another example of the optical system of the pickup 11 in the optical information recording/reproduction apparatus 10. The optical beam from a light source 301 transmits a collimated lens 302, and is made incidence to a shutter 303. While the shutter 303 is opened, the optical beam passes through the shutter 303, and has the polarizing direction controlled so that an optical element 304 sets the light intensity ratio between the p-polarized component and the s-polarized component to a desired ratio. It is then made incidence to a PBS (Polarization Beam Splitter) prism 305.

The optical beam which has transmitted the PBS prism 305 serves as a signal beam 306. The optical beam diameter is expanded by a beam expander 308. The beam then transmits a PBS prism 309, and is made incidence to a spatial light modulator 310.

The signal beam to which the information is added by the spatial light modulator 310 is reflected by the PBS prism 309, and propagates through a relay lens 311 and a spatial filter 312. Thereafter, the signal beam transmits a prism 325, and is condensed on the optical information recording medium 1 by an objective lens 313. The spatial modulator 310 may be configured to be combined with a phase mask function. The prism 325 is disposed for the purpose of aligning the optical path of the signal beam with the optical length so as to dispose the PBS prism 324 on the optical path of the reference beam.

Meanwhile, the optical beam reflecting from the PBS prism 305 serves as a reference beam 307, is reflected by the galvanic mirror 317, transmits the lens 319, is reflected by the PBS prism 324, and is made incidence to the objective lens 313, and then to the optical information recording medium 1. The angle of the galvanic mirror 317 may be adjusted by an actuator 318 so that the incident angle of the reference beam that is made incidence to the optical information recording medium 1 is set to the desired angle.

The signal beam and the reference beam are made incidence to the optical information recording medium 1 while being overlapped with each other so that the interference pattern is formed inside the recording medium. The information is recorded by writing the pattern into the recording medium. The galvanic mirror 317 is capable of changing the incident angle of the reference beam made incidence to the optical information recording medium 1, which makes it possible to record through angular multiplexing.

Figure 13:
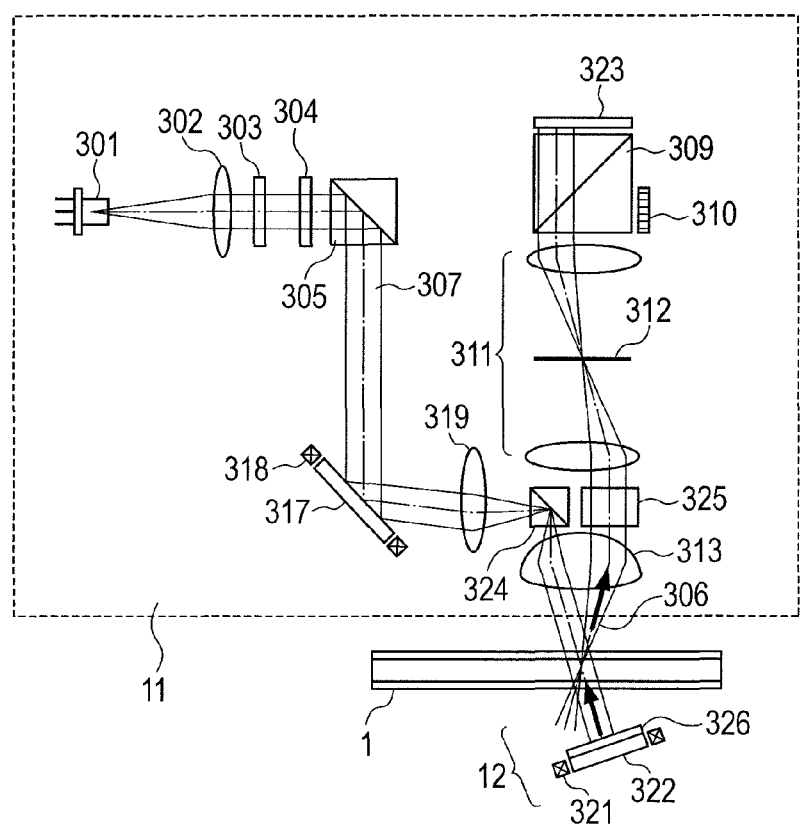
FIG. 13 is a schematic view representing reproduction principle of the pickup in the optical information recording/reproduction apparatus according to the eighth embodiment.

FIG. 13 represents reproducing principle of an example of the basic optical system structure of the pickup 11 in the optical information recording/reproduction apparatus 10. When reproducing the recorded information, the reference beam is made incidence to the optical information recording medium 1, and the optical beam which has transmitted the optical information recording medium 1 is reflected by the galvanic mirror 322 which has the angle adjustable by the actuator 321, thus generating the phase conjugate beam. The quarter-wavelength plate is disposed between the optical information recording medium 1 and the galvanic mirror 322. The reference beam as the s-polarized component which has transmitted the optical information recording medium 1 further transmits the quarter-wavelength plate to be circularly polarized. It is reflected by the galvanic mirror 322, and transmits the quarter-wavelength plate again so as to be brought into the p-polarized component.

The optical beam recovered by the phase conjugate beam propagates through the objective lens 313, a relay lens 311, and the spatial filter 312. Thereafter, the recovered optical beam transmits the PBS prism 309, and is made incidence to the photodetector 323 for reproducing the recorded signal.

Figure 14:
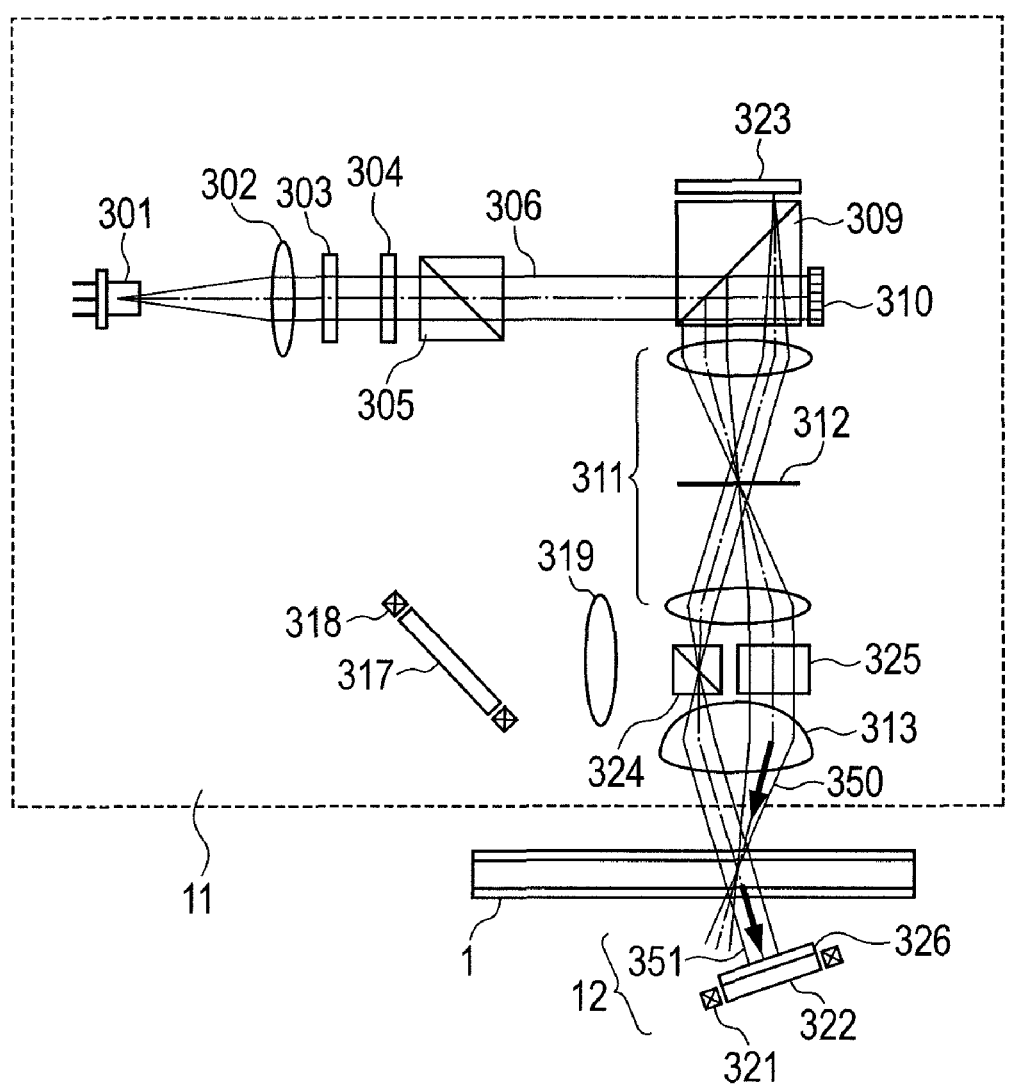
FIG. 14 is a schematic view representing the pickup in the optical information recording/reproduction apparatus according to the eighth embodiment.

FIG. 14 shows the sixth embodiment which uses the optical system structure shown in FIGS. 12 and 13. In the case where the appropriate reference beam angle is detected, an adjusting beam 350 is radiated to the optical information recording medium 1 through the optical path of the signal beam while setting a part of or all the pixels of the spatial light modulator 310 ON to diffract a diffraction beam 351. The diffracted diffraction beam 351 transmits a quarter-wavelength plate 326, is reflected by a galvanic mirror 322, and transmits the quarter-wavelength plate 326 again, the optical information recording medium 1, the objective lens 313, the PBS prism 323, the relay lens 311, the spatial filter 312, and the PBS prism 305, respectively. It is condensed on and made incidence to the photodetector 323. As the position of the bright point of the photodetector 323 varies in accordance with the angle of the diffracted diffraction beam, each angle of the galvanic mirrors 317 and 322 may be controlled at the appropriate value based on the detected bright point position.

The method for using the spatial light modulator 310 for detecting the appropriate reference beam angle is common to the case of the spatial light modulator 210 in the first embodiment, and explanation thereof, thus will be omitted.

The operation as an example shown in FIG. 16 likewise the second embodiment may be applied to detection of the appropriate reference beam angle. This embodiment is different in the use of the photodetector 323 for detecting the appropriate reference beam angle instead of the photodetector 236.

In the embodiment, the range in which the pixels of the photodetector 323 for detecting the recovered signal beam are arranged is enlarged so as to detect the diffracted diffraction beam, requiring no additional photodetector.

In the optical information recording/reproduction apparatus according to the present invention, the diffraction beam diffracted by radiating the adjusting beam having the frequency and phase distributions partially the same as those of the signal beam upon recording to the recorded hologram is detected to allow control of the appropriate reference beam angle, thus recovering the appropriate signal beam.

The invention has been described mainly taking the recording/reproducing apparatus as the example. However, the present invention may be applied to the reproduction apparatus.

What is claimed is:

1. A reproduction apparatus for reproducing information from a recording medium which records an interference pattern generated by two optical beams, comprising:
   a laser light source for radiating a laser beam;
   an optical element for separating the laser beam from the laser light source into a first optical beam and a second optical beam;
   a spatial light modulator for adding adjusting information to the separated first optical beam;
   an objective lens for condensing the first optical beam to which the adjusting information is added on the recording medium;
   a photodetector for detecting a beam diffracted by radiating the condensed first optical beam to the recording medium; and
   an angular adjusting portion for adjusting an incident angle of the second optical beam to the recording medium based on information obtained from the photodetector,
   wherein when reproducing the information from the recording medium, the second optical beam adjusted by the angular adjusting portion is radiated to the recording medium to reproduce the information recorded in the recording medium.

2. The reproduction apparatus according to claim 1, wherein:
   the interference pattern is generated by a reference beam; and
   the first optical beam to which the adjusting information is added is a beam with an amplitude distribution and a phase distribution which are at least partially the same as those of the signal beam used for recording the information.

3. The reproduction apparatus according to claim 2, wherein the first optical beam is radiated to the recording medium through an optical path of the signal beam.

4. The reproduction apparatus according to claim 1, wherein the adjusting information which contains the header information is recorded in the recording medium.

5. The reproduction apparatus according to claim 1, wherein the angular adjusting portion is formed of a mirror and an actuator for controlling the mirror, or an element capable of converting a wavefront of the reference beam.

6. The reproduction apparatus according to claim 1, wherein:
the photodetector detects information with respect to a position of a bright point of the diffracted beam; and
the angular adjusting portion adjusts an incident angle of the reference beam made incidence to the recording medium based on the information with respect to the position of the bright point of the reference beam used for recording the information and the information with respect to the position of the bright point of the detected diffracted beam.

7. The reproduction apparatus according to claim 6, wherein the photodetector is capable of two dimensionally detecting beam information.

8. The reproduction apparatus according to claim 2, further comprising:
a phase conjugate optical system for generating a phase conjugate beam of the reference beam; and
a first photodetector for detecting the signal beam reproduced by radiating the phase conjugate beam to the recording medium which records the information.

9. The reproduction apparatus according to claim 1, wherein all pixels of the adjusting information added by the spatial light modulator are set ON.

10. A reproduction method for reproducing information from a recording medium which records an interference pattern generated by two optical beams, comprising:
separating a laser beam from a laser light source into a first optical beam and a second optical beam;
adding adjusting information to the separated first optical beam;
diffracting a diffraction beam by radiating the separated first optical beam, to which the adjusting information is added, on the recording medium;
detecting the diffracted diffraction beam;
adjusting an angle of the second optical beam used for reproducing the information of the recording medium based on the detected diffraction beam; and
reproducing the information recorded in the recording medium by radiating the adjusted second optical beam to the recording medium for reproducing the information from the recording medium.

11. The reproduction method according to claim 10, wherein:
the interference pattern is generated by a reference beam and a signal beam; and
the first optical beam to which the adjusting information is added is a beam with an amplitude distribution and a phase distribution which are at least partially the same as those of the signal beam used for recording the information.

12. The reproduction method according to claim 11, wherein the first optical beam is radiated to the recording medium through an optical path of the signal beam.

13. The reproduction method according to claim 10, wherein the adjusting information which contains the header information is recorded in the recording medium.

14. The reproduction method according to claim 10, wherein all pixels of the added adjusting information are set ON.

* * * * *